(12) United States Patent
Murnane, Jr. et al.

(10) Patent No.: US 9,366,562 B2
(45) Date of Patent: Jun. 14, 2016

(54) VAPOR ELIMINATION LIQUID PROVING SYSTEM WITH TOP OR BOTTOM FILL AND BOTTOM DRAIN PROVER

(71) Applicant: Pemberton Fabricators, Inc., Rancocas, NJ (US)

(72) Inventors: Robert M. Murnane, Jr., Hamilton, NJ (US); Christopher Lewis Bradley, Maple Shade, NJ (US); Henry Vernon Oppermann, New Orleans, LA (US); Daniel L. Clemens, Columbus, NJ (US)

(73) Assignee: PEMBERTON FABRICATORS, INC., Rancocas, NJ (US)

( * ) Notice: Subject to any disclaimer, the term of this patent is extended or adjusted under 35 U.S.C. 154(b) by 454 days.

(21) Appl. No.: 14/085,027

(22) Filed: Nov. 20, 2013

(65) Prior Publication Data

US 2014/0137625 A1    May 22, 2014

Related U.S. Application Data

(60) Provisional application No. 61/729,397, filed on Nov. 22, 2012.

(51) Int. Cl.
| | | |
|---|---|---|
| *G01F 25/00* | (2006.01) | |
| *B05B 1/30* | (2006.01) | |
| *B65D 90/48* | (2006.01) | |
| *B67D 7/04* | (2010.01) | |

(52) U.S. Cl.
CPC .............. *G01F 25/0007* (2013.01); *B05B 1/30* (2013.01); *G01F 25/0038* (2013.01); *B65D 90/48* (2013.01); *B67D 7/0478* (2013.01); *G01F 25/0084* (2013.01); *G01F 25/0092* (2013.01)

(58) Field of Classification Search
USPC .......................................... 73/1.31
See application file for complete search history.

(56) References Cited

U.S. PATENT DOCUMENTS

| | | | | |
|---|---|---|---|---|
| 4,606,218 A | * | 8/1986 | Chisman, III | ....... G01F 25/0015 73/1.17 |
| 4,694,679 A | * | 9/1987 | Woods | ..................... G01N 9/04 73/1.02 |
| 7,874,195 B2 | * | 1/2011 | Murnane, Jr. | ....... G01F 25/0038 73/1.31 |
| 9,228,880 B2 | * | 1/2016 | Murnane, Jr. | ....... G01F 25/0038 |

* cited by examiner

*Primary Examiner* — Clayton E Laballe
*Assistant Examiner* — Dennis Hancock
(74) *Attorney, Agent, or Firm* — Philip O. Post

(57) ABSTRACT

A liquid proving system is provided with a small volume liquid prover draining into a liquid holding tank that has capacity for multiple proving measurements. The small volume liquid prover can either be top-filled or bottom-filled, or exclusively bottom-filled. A liquid holding tank baffle assembly contains saturated vapor from an initial number of fills of the liquid holding tank within the small volume prover to improve overall accuracy of the proving measurements. When liquid is pumped into the prover evaporation of the liquid being pumped into the prover, and release of vapors from the prover, is inhibited due to the saturated vapor environment established by a saturated vapor volume in the prover, which results in a more accurate prover measurement of liquid pumped into the prover. The saturated vapor volume is contained with a vapor tank baffle assembly in the liquid holding tank; a vapor conduit connecting the interior of the liquid holding tank to the interior of the prover; and the interior volume of the prover.

30 Claims, 16 Drawing Sheets

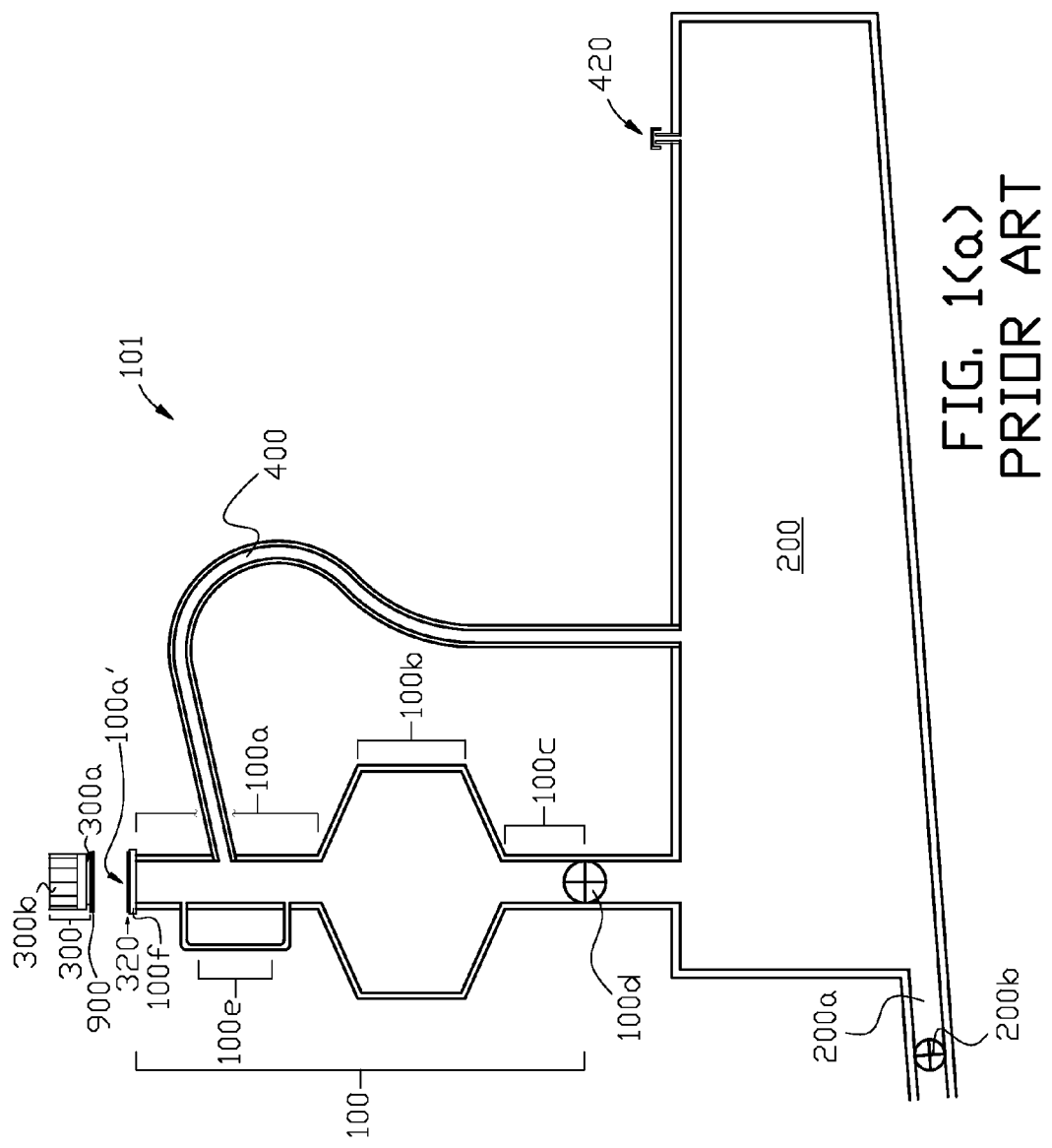

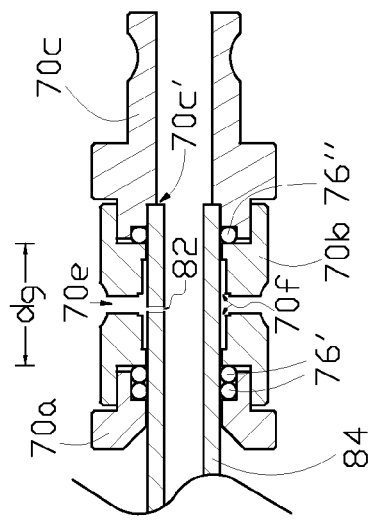
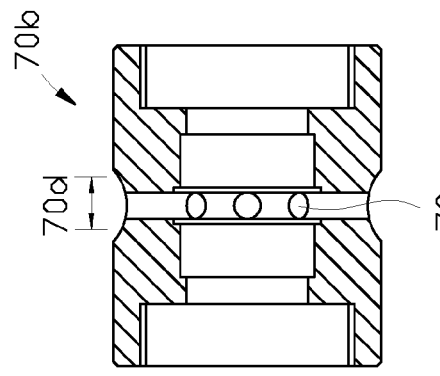
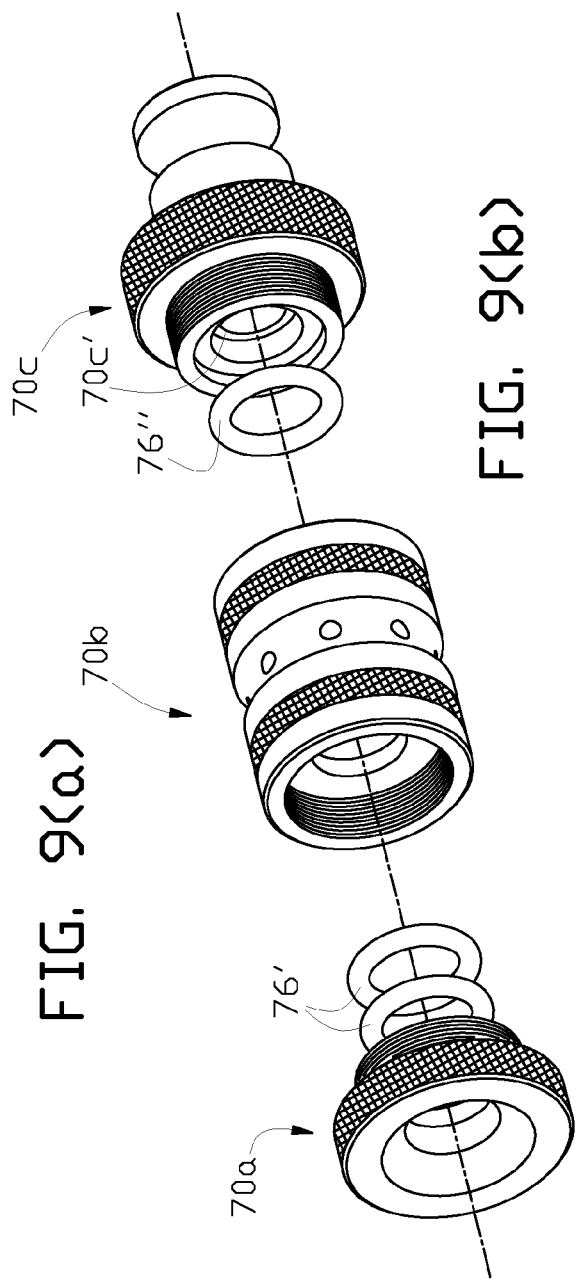
FIG. 9(a)
FIG. 9(b)
FIG. 9(c)
FIG. 9(d)

VAPOR ELIMINATION LIQUID PROVING SYSTEM WITH TOP OR BOTTOM FILL AND BOTTOM DRAIN PROVER

CROSS REFERENCE TO RELATED APPLICATIONS

This application claims the benefit of U.S. Provisional Application No. 61/729,397, filed Nov. 22, 2012, hereby incorporated by reference in its entirety.

FIELD OF THE INVENTION

The present invention relates to bottom drain liquid proving systems, including provers used to calibrate volume meters on gasoline and diesel pumps at filling stations, and nozzle adapter assemblies for gasoline and diesel nozzles used with liquid dispensing pumps.

BACKGROUND OF THE INVENTION

Liquid proving systems utilizing a bottom drain liquid prover that drains into a liquid holding tank can be used to prove the accuracy of the reading displayed on a liquid dispensing pump. U.S. Pat. No. 7,874,195 (to Murnane, Jr.; also Canadian Patent No. 2,626,280) and U.S. Patent Application Publication No. 2012/0137750 (to Murnane, Jr. et al.; also Canadian Patent No. 2,727,049) describe the art of proving systems that can be used, in particular, to prove gasoline and diesel pumps at filling (gas) stations (or gas bars) where top-fill and bottom-drain provers are used. Top-fill and bottom-drain provers (test measures) are conveniently used in these small volume applications (typically five gallons (20 liters) or less) since existing standards and convention dictate use of such provers. Combined top-fill or bottom-fill and bottom drain provers are limited in use in known proving systems to large volume meter applications, such as metered filling of gasoline tanker trucks, where a single proving measurement is performed, after which the large volume combined top-fill or bottom-fill and bottom-drain prover is emptied back into the tank from which the liquid was drawn. These combined top-fill or bottom-fill provers typically range in capacity from 500 gallons (1,500 liters) to 1,500 gallons (5,000 liters). Such large volume single proving measurement applications are contrasted with existing small volume top-fill and bottom-drain applications that drain to a directly connected liquid holding tank so that multiple proving measurements can be performed before the liquid holding tank must be emptied back into the tank from which the liquid was drawn.

Illustrated in FIG. 1(a) is known liquid prover system 101. Bottom drain prover 100 is installed near a front end of liquid holding tank 200 with the interior of the prover's drain section 100c connected to the interior of liquid holding tank 200 via drain valve 100d. Bottom drain prover 100 typically has a narrow upper neck 100a with fill opening 100a' for filling the prover with liquid from the liquid dispensing pump, a wider diameter body section 100b for accumulating and holding the bulk of the liquid pumped into the prover, and a narrow drain section 100c with a drain opening. Drain valve 100d is provided for controlling release of the accumulated liquid from the prover via drain valve lever mechanism 100d' (shown in FIG. 1(b)). The prover's volume gauge or indicator can be a gauge glass tube 100e that has its interior volume connected to the interior volume of neck 100a. The gauge glass is marked along its height with a neck scale that reflects the capacity of liquid in the above prover when drain valve 100d is closed and the prover is filled with liquid up to the neck region of the prover. The nominal capacity of the prover, and deviations therefrom, are marked on the scale using standards that are established by the applicable standards organizations. Use of the prover is as disclosed in U.S. Pat. No. 7,874,195. Vapor conduit 400 connects the interior volumes of neck 100a and tank 200 so as to form a closed path for vapors in prover 100 and tank 200. The combination of nozzle sealing gasket 900 and nozzle removed self seal assembly 320 minimizes the release of vapors from top-fill opening 100a' regardless of whether or not the dispensing pump's nozzle is inserted into the fill opening. Ambient air vent 420 allows ambient (atmospheric) pressure equalization in the liquid holding tank as the tank is filled with liquid drained from the prover, and emptied via the tank's discharge line 200a and discharge control valve 200b.

FIG. 1(b) illustrates three of the liquid prover systems shown in FIG. 1(a) connected to common support structure 920.

FIG. 3(a) illustrates nozzle removed self seal assembly 320 used with the prover system shown in FIG. 1(a). The nozzle removed self seal assembly comprises sealing plate 340 (FIG. 4), which is in the shape of an annular disk with an annulus or through opening 340a, and through opening self sealing assembly 360 (FIG. 5 with sealing plate 340 shown in dashed lines), which opens when a dispensing pump's nozzle is inserted in the through opening and closes when the nozzle is withdrawn from the through opening. The diameter of the through opening is identified as "d" in FIG. 3(a). Generally through opening 340a is limited in size to the outer dimension of the nozzle to be inserted into the through opening with additional clearance as required for nozzle insertion into the through opening.

In FIG. 3(a), nozzle sealing gasket 900 is seated adjacently above nozzle removed self seal assembly 320 to form a combination prover fill opening self sealing assembly wherein the nozzle sealing gasket 900 primarily prevents release of vapors through the fill opening when a nozzle is inserted in opening 900a in gasket 900, and closed flapper door 360a in the nozzle removed self seal assembly 320 prevents release of vapors through the fill opening when a nozzle is not inserted through opening 340a in sealing plate 340. Nozzle sealing gasket 900 has opening 900a, which is sufficiently large in cross section (shown as diameter "$d_1$" in FIG. 3(a)) to push a nozzle through while substantially maintaining a vapor seal between the perimeter of opening 900a and the exterior section of the nozzle pushed through opening 900a. As shown in FIG. 3(b), alternative nozzle sealing gasket 900' may be of an annular ring shape and positioned within through opening 340a as shown in FIG. 3(a).

FIG. 5 illustrates through opening self sealing assembly 360 that can be used with the prover system shown in FIG. 1(a). The through opening self assembly comprises flapper door 360a, self-closing spring loaded hinge 360b, and shim 360c as shown in FIG. 6(a), FIG. 6(b) and FIG. 6(c), respectively. Flapper door 360a is located on the side of sealing plate 340 that faces the interior of the prover's neck volume, and positioned so that the flapper door is seated over the entire through opening 340a when a nozzle is not positioned in the through opening, thus providing a seal to prevent release of vapors through the fill opening to atmosphere. Flapper door 360a is attached to first wing 360b' of self-closing spring loaded hinge 360b while the second wing 360b" is suitably attached to shim 360c, which, in turn, is suitably attached to sealing plate 340 as seen in FIG. 3(a). The first and second wings are suitably connected to spring 370 of the self-closing spring loaded hinge. Therefore the flapper door ensures that vapors are not released from the neck of prover 100 to atmosphere unless a dispensing pump's nozzle is inserted into the sealing plate's through opening 340*a*. Inserting the nozzle into the through opening will force the spring loaded flapper door to open against the inserted nozzle. Preferably the diameter of through opening 340*a* is sufficiently large enough to allow easy passage of the nozzle, or a range of nozzles, intended to be used with the prover, without excess release of vapors though any clearance space between the through opening and the outer diameter of the nozzle.

The combination of nozzle sealing gasket 900 and nozzle removed self seal assembly 320 minimizes the release of vapors from fill opening 100*a*' regardless of whether the dispensing pump's nozzle is inserted into the fill opening.

Ambient air vent 420 (FIG. 1(*a*) and FIG. 1(*b*)) is generally located near the (rear) end of liquid holding tank 200 that is opposite the (front) end near where prover 100 is located.

As illustrated in FIG. 1(*a*), FIG. 2(*a*) and FIG. 2(*b*) breather cap assembly 300 can be disposed over nozzle sealing gasket 900 and nozzle removed self seal assembly 320 when prover 100 is not being used for extended periods, for example, when the prover is being transported between gas stations. As seen in FIG. 2(*c*) through 2(*e*), through opening 900*a* in nozzle sealing gasket 900 is smaller than the through openings 300*a*' and 100*f* in bayonet flange 300*a* and prover's neck flange 100*f*. Further opening 900*a* is sized to form a tight fit around the exterior of a pump's nozzle that is inserted through the opening. Typical nozzle sealing gasket 900 comprises a flexible material, such as a rubber composition, at least around through opening 900*a* so that the gasket seals around the nozzle inserted through opening 900*a*.

Liquid prover system 101 as described above and in U.S. Pat. No. 7,874,195 results in an improved accuracy particularly when the liquid is highly volatile. It is an object of the present invention to provide a liquid prover with an improved vapor elimination system that results in greater accuracy than that of the liquid proving system described above when the bottom-drain prover is connected to a liquid holding tank.

It is another object of the present invention to provide a liquid proving system with a selectable top-fill or bottom-fill and bottom-drain prover that can be used in small volume proving applications.

It is another object of the present invention to provide a liquid proving system with a bottom-fill and bottom-drain prover that can be used in small volume proving applications.

It is another object of the present invention to provide a nozzle adapter assembly that can be used with nozzles, including automatic shut-off nozzles, that are used with liquid dispensing pumps.

BRIEF SUMMARY OF THE INVENTION

In one aspect the present invention is apparatus for, and process of, measuring a volume of liquid with a small volume bottom drain liquid proving system. The small volume bottom drain prover is a combined top-fill and bottom-fill prover, or a bottom-fill prover without top-fill. The small volume bottom drain prover has an upper section for receiving the liquid when the top-fill option is used, an intermediate section for accumulating liquid pumped into the prover, and a small volume bottom drain section for draining accumulated liquid from the prover into a liquid holding tank and receiving the liquid when the bottom-fill is used. A prover gauge or indicator is in communication with the interior volume of the prover to measure a volume of liquid pumped into the prover. A vapor conduit is provided between the upper section of the prover and the interior volume of the liquid holding tank to establish a saturated vapor environment in the interior volume of the prover with a vapor tank baffle assembly.

If the optional top-fill is provided, a prover fill opening self sealing assembly is disposed over the top opening in the upper section of the prover through which liquid is pumped into the prover. The prover fill opening self sealing assembly has a self sealing opening that opens when a liquid dispensing nozzle is pushed against the self sealing opening and forms a substantially vapor tight seal around the nozzle.

A vent connects the interior volume of the liquid holding tank to atmosphere and a liquid holding tank controlled fill volume is provided in the liquid holding tank to ensure saturated vapor remains in the fluid loop defined by the liquid holding tank controlled fill volume, the vapor conduit and the bottom-drain prover.

A nozzle adapter assembly can be provided so that a nozzle, including an automatic shut-off nozzle, used with the liquid dispensing pump can be used directly with a bottom-fill prover of the present invention or other test and measurement equipment.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

FIG. 1(*b*) is an isometric view of three bottom-drain liquid provers shown in FIG. 1(*a*), with their dedicated separate liquid holding tanks connected to a common support structure.

FIG. 2(*b*) is a side elevation exploded view of the prover fill opening self sealing assembly and breather cap assembly used with the prover system shown in FIG. 1(*a*).

FIG. 2(*c*), FIG. 2(*d*) and FIG. 2(*e*) are top views of a bayonet flange used with the breather cap assembly; nozzle sealing gasket; and prover's neck flange, respectively.

FIG. 3(*b*) is one alternative prover top-fill opening self sealing assembly that can be used with the prover system shown in FIG. 1(*a*).

FIG. 9(a) is an isometric view of one example of an automatic shut-off nozzle adapter assembly used in the present invention.

FIG. 9(b) is an isometric exploded view of the automatic shut-off nozzle adapter assembly shown in FIG. 9(a).

FIG. 9(c) is a cross section elevation view of the automatic shut-off nozzle vacuum tube sensing port interface component used in the automatic shut-off nozzle adapter assembly shown in FIG. 9(a) and FIG. 9(b).

FIG. 9(d) is a cross sectional elevation view of the automatic shut-off nozzle adapter assembly shown in FIG. 9(a) and FIG. 9(b) with a nozzle's spout inserted therein.

DETAILED DESCRIPTION OF THE INVENTION

Figure 1B:
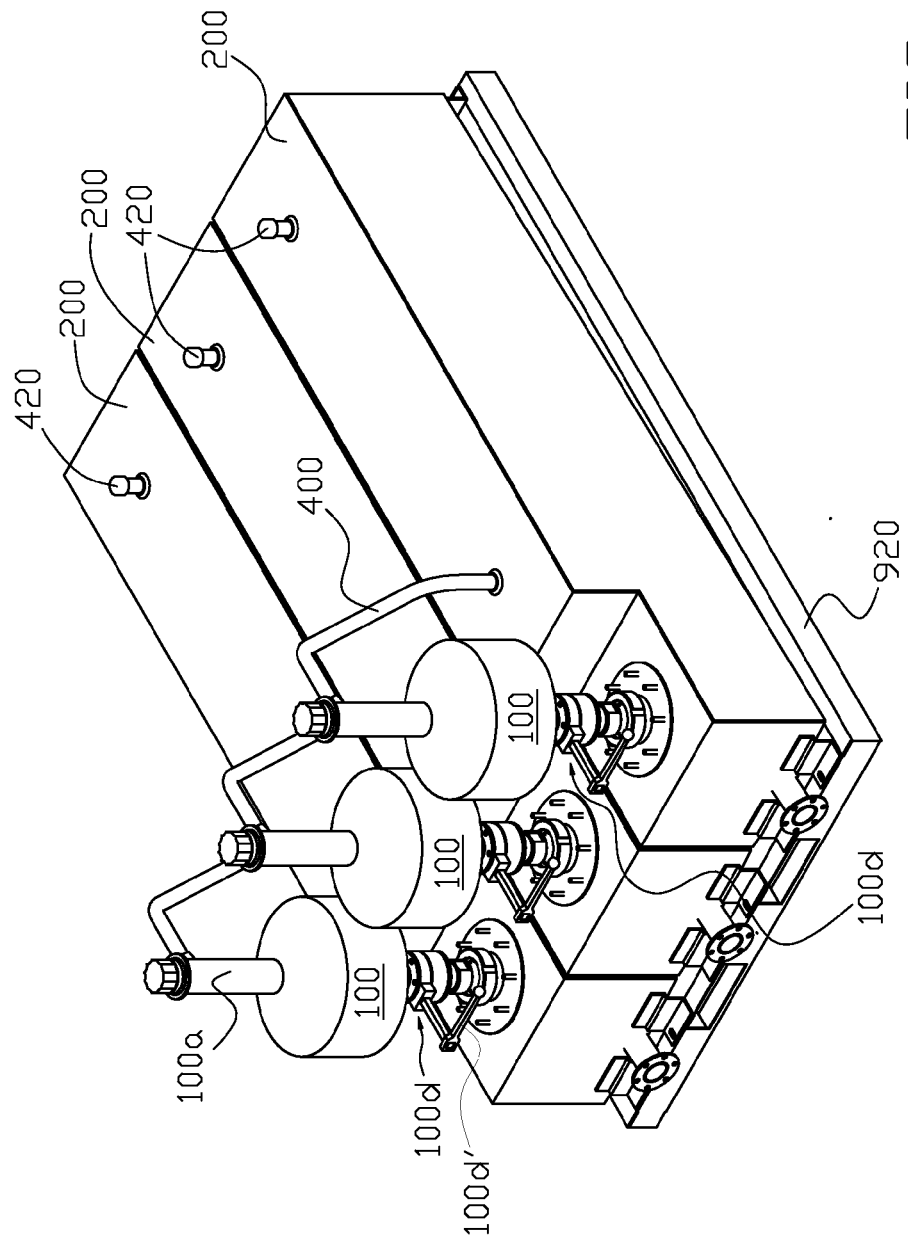
FIG. 1(*a*) is a simplified cross sectional elevation view of an existing top-fill and bottom-drain liquid prover with the prover's drain connected to a liquid holding tank.
Figure 2A:
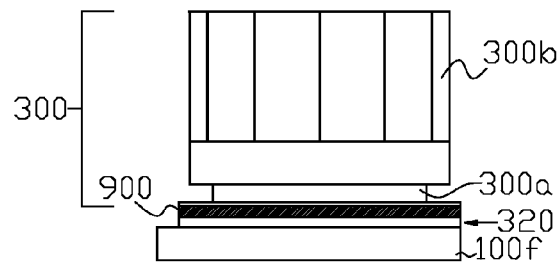
FIG. 2(*a*) is a side elevation view of a breather cap assembly used with the prover system shown in FIG. 1(*a*).
Figure 2C:
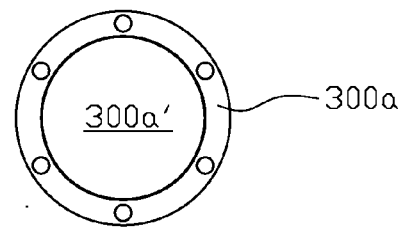
Figure 2B:
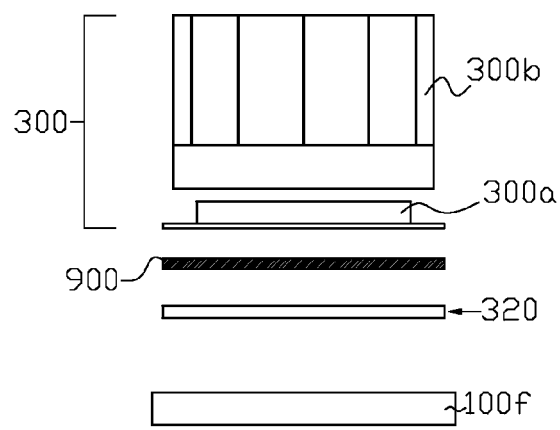
Figure 2D:
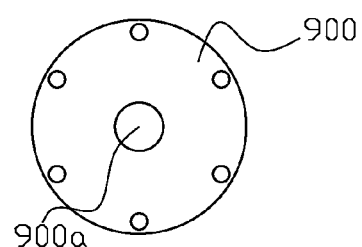
Figure 2E:
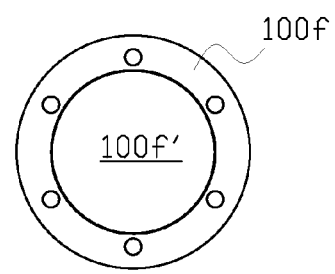
Figure 3A:
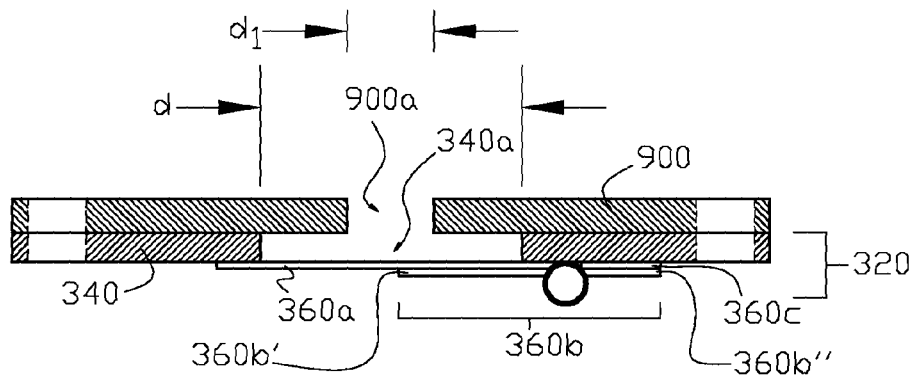
FIG. 3(*a*) is a prover top-fill opening self sealing assembly used with the prover system shown in FIG. 1(*a*).
Figure 4:
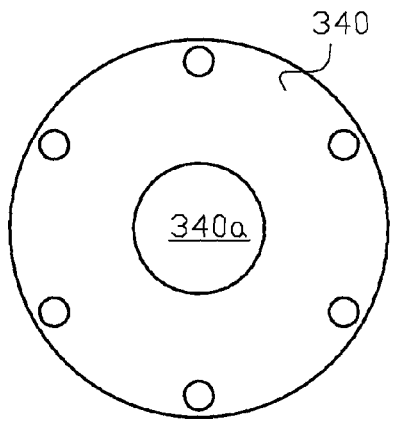
FIG. 4 is one example of a sealing plate used in a nozzle removed self seal assembly that forms a part of the prover top-fill opening self sealing assembly shown in FIG. 3(*a*).
Figure 5:
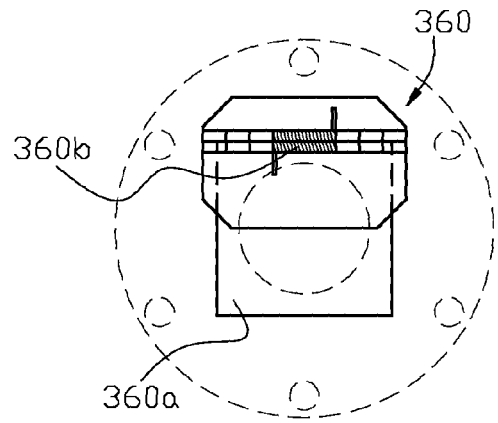
FIG. 5 is one example of a through opening self sealing assembly that forms a part of the nozzle removed self seal assembly shown in FIG. 4.
Figures 6B, 6C:
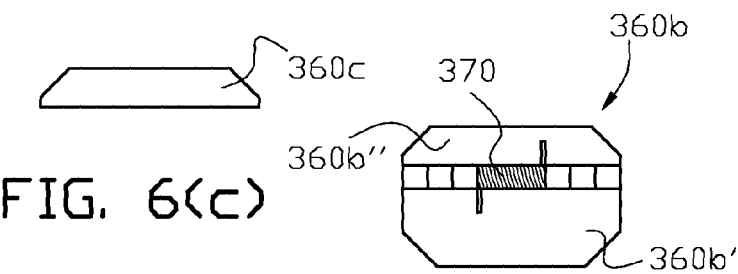
FIG. 6(*a*), FIG. 6(*b*) and FIG. 6(*c*) illustrate components of the through opening self sealing assembly shown in FIG. 5
Figure 6A:
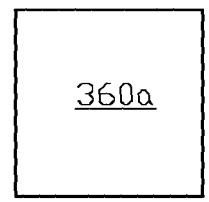
Figure 3B:
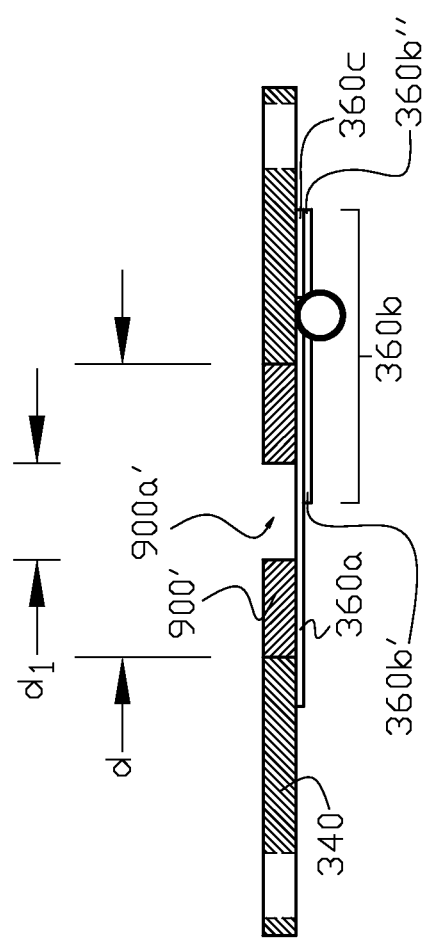
Figure 7A:
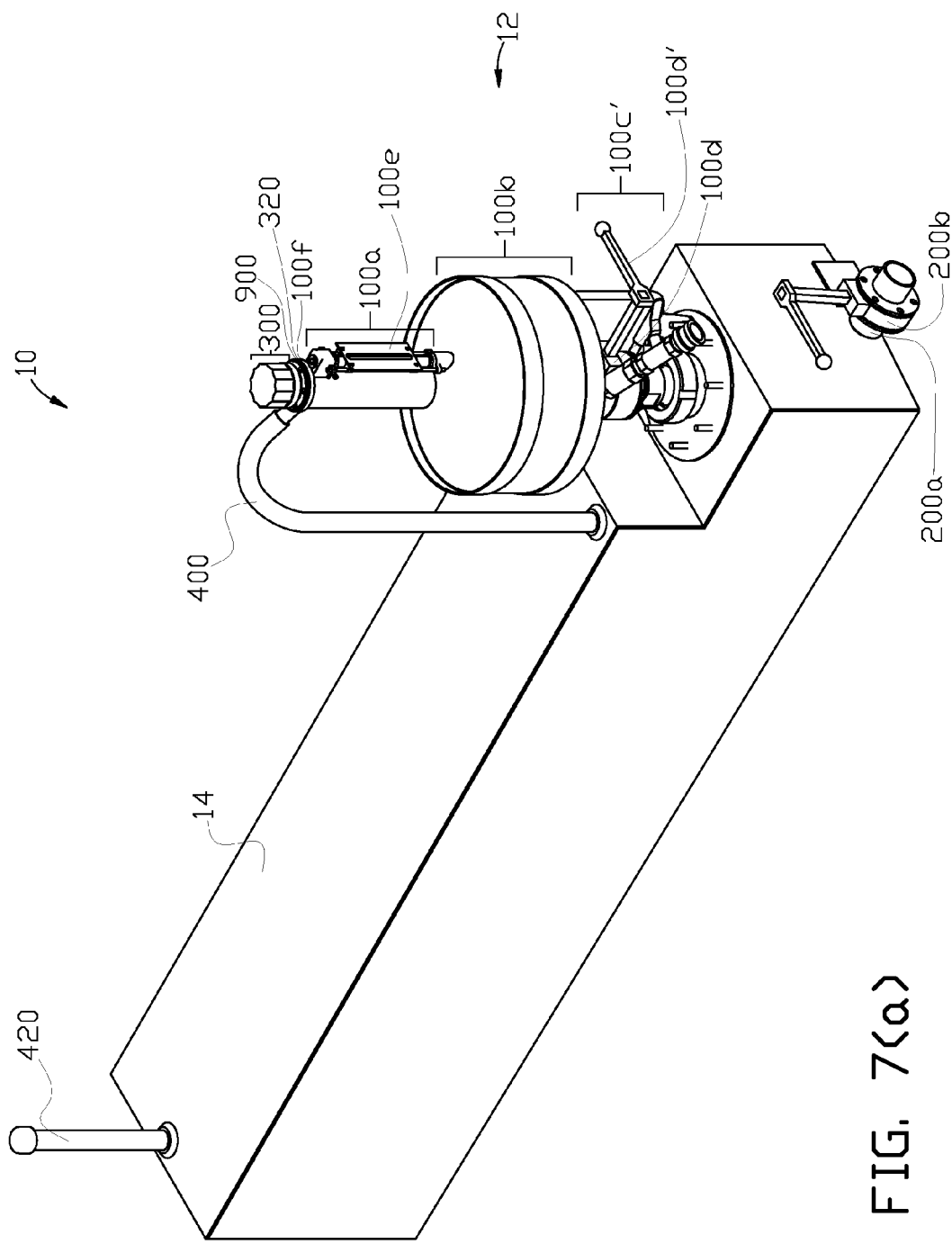
FIG. 7(*a*) is an isometric view of one example of a combined top-fill or bottom-fill and small volume bottom drain liquid prover of the present invention used in one example of a proving system of the present invention.
FIG. 7(b) is a simplified cross sectional elevation view of one example of the small volume bottom drain liquid proving system shown in FIG. 7(a).
Figure 7B:
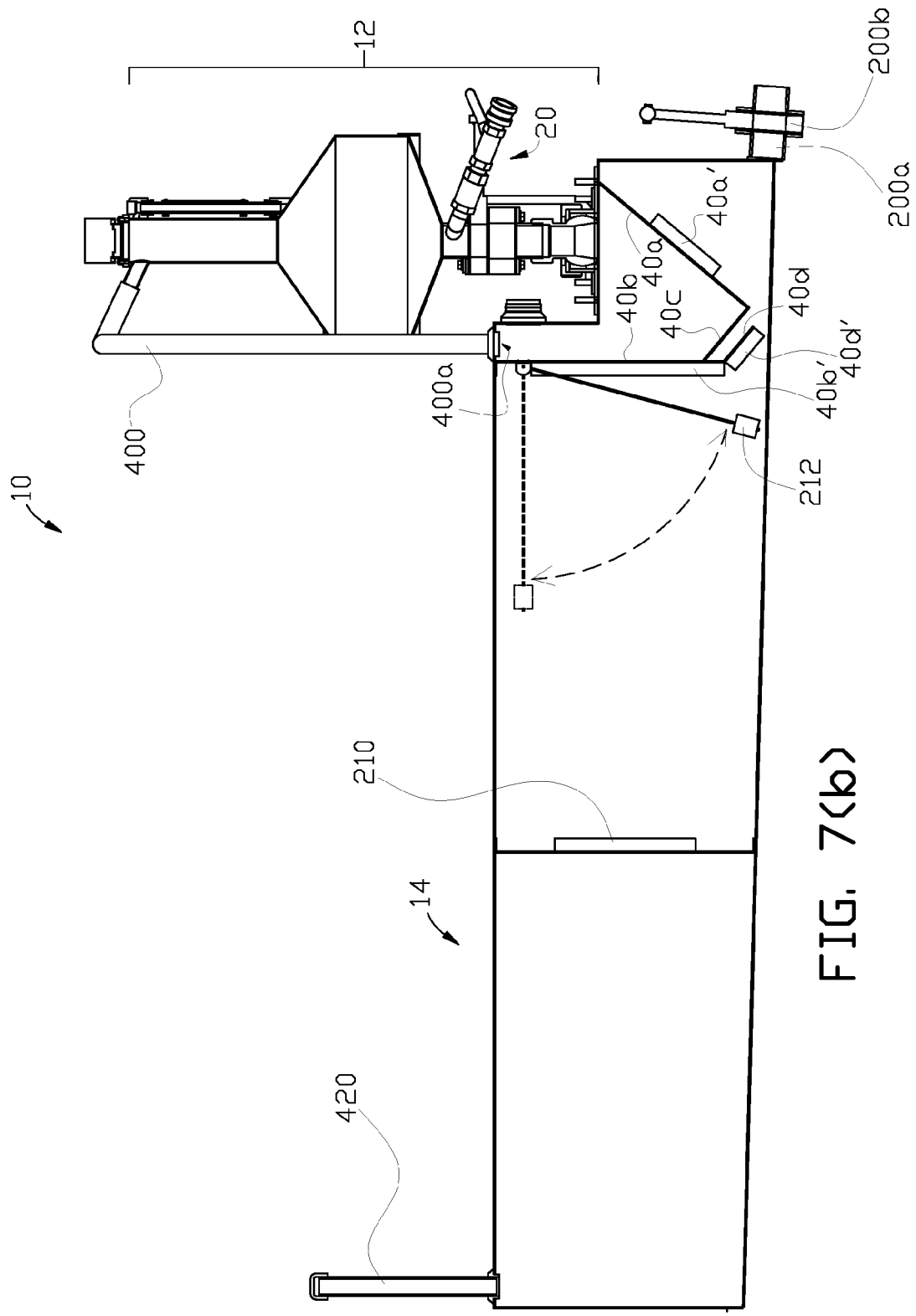

Referring now to the drawings, wherein like numerals indicate like elements there is shown in FIG. 7(a) and FIG. 7(b) one example of liquid prover system 10 of the present invention. The liquid prover system in this example comprises (test measure) prover 12 and liquid holding tank 14.

Figure 8A:
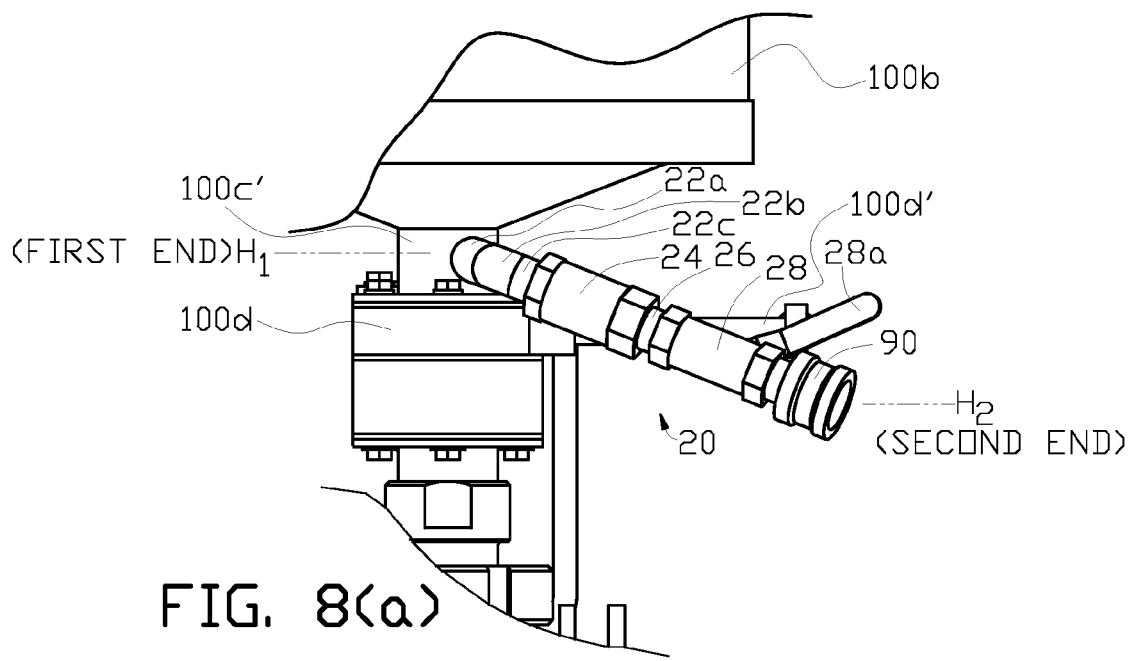
FIG. 8(a) is a detail isometric view of one example of a bottom-fill assembly used with the liquid proving system shown in FIG. 7(a) and FIG. 7(b).
Figure 8B:
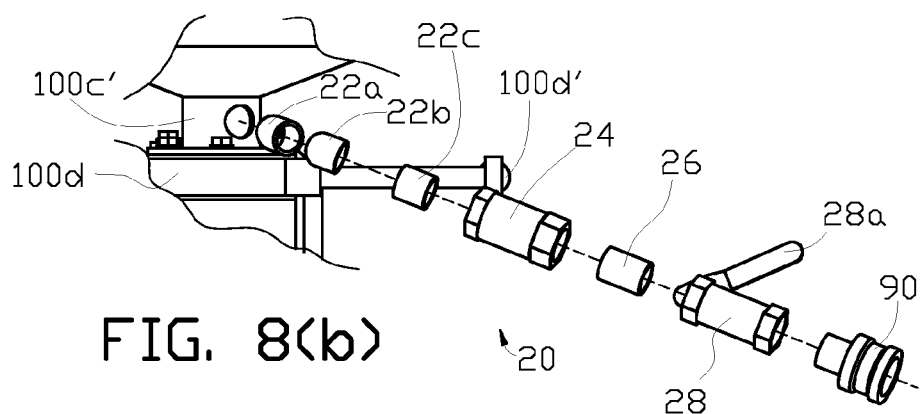
FIG. 8(b) is an exploded view of the bottom-fill assembly shown in FIG. 8(a).
Figure 8C:
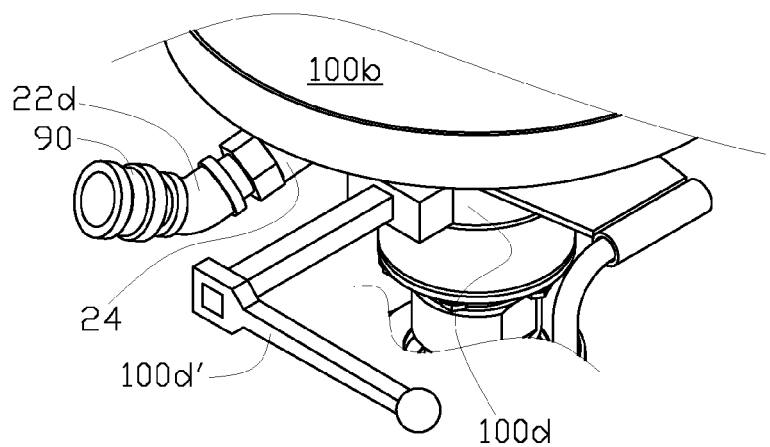
FIG. 8(c) is a detail isometric view of another example of a bottom-fill assembly used with the liquid proving system shown in FIG. 7(a) and FIG. 7(b).

In some examples of the present invention prover 12 is similar to prover 100 described above with the addition of bottom-fill assembly 20 in modified drain section 100c'. Bottom-fill assembly 20 used in this example is best seen in FIG. 8(a) and FIG. 8(b). In general bottom-fill assembly 20 is a tubular assembly with its interior opening (through passage) having a first (prover) end into drain section 100c' of prover 12, which is located above drain valve 100d. The interior of the second (supply) end of the bottom-fill assembly that opposes the first end is connected to a supply of liquid (such as gasoline) that is being volumetrically measured by the prover system as further described below. In this example of the invention, the first end of the bottom-fill assembly is at a horizontal height $H_1$ that is higher than the horizontal height $H_2$ of the second end of the bottom-fill assembly. In other examples of the invention, the horizontal height $H_1$ may be lower than the horizontal height $H_2$ of the second end of the bottom-fill assembly as illustrated in FIG. 8(c) with elbow fitting 22d, for example, when the nozzle adapter assembly 70, as further described below and illustrated in FIG. 11(c) with elbow fitting 22d, is used. In all examples of the invention, it is preferable that at least the check valve 24 is disposed at a lower height than the first (prover) end of the bottom-fill assembly to prevent the trapping of air in the bottom-fill assembly (between the first (prover end) and the check valve) when an optional top-fill is utilized.

Figure 11A:
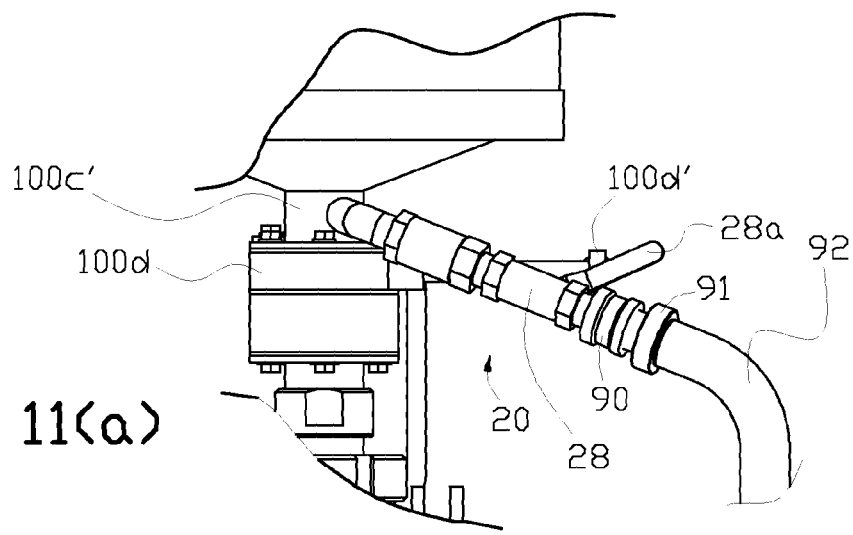
FIG. 11(a) is the detail isometric view of the bottom-fill assembly shown in FIG. 8(a) when used with a liquid dispensing pump's hose.
Figure 11B:
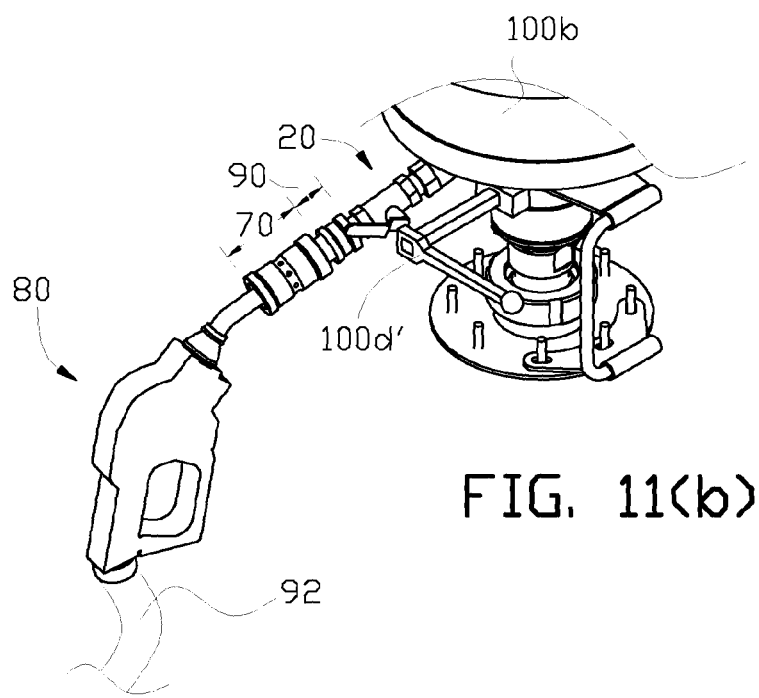
FIG. 11(b) is the detail isometric view of the bottom-fill assembly shown in FIG. 8(a) when used with an automatic shut-off nozzle and nozzle adapter assembly shown in FIG. 9(a).
Figure 11C:
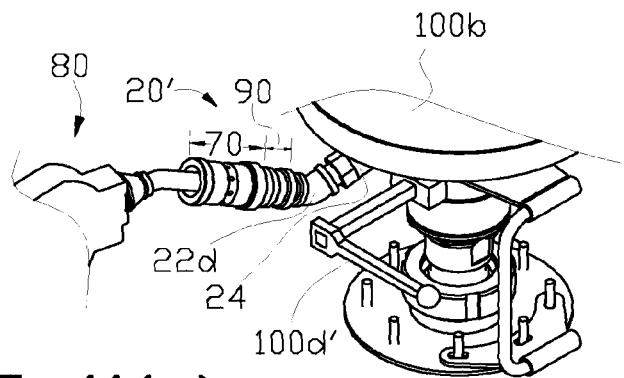
FIG. 11(c) is a detail isometric view of another example of a bottom-fill assembly when used with the automatic shut-off nozzle and nozzle adapter assembly shown in FIG. 9(a).

In this particular example in FIG. 8(a) and FIG. 8(b) elbow assembly 22 comprises fittings 22a, 22b and 22c and is provided as a matter of convenience to provide a satisfactory position of the bottom-fill assembly relative to other components of the prover system. In this example of the invention, fittings 22a and 22c are pipe sections suitably connected to elbow fitting 22b. Fitting 22c is connected to the outlet of check valve 24 that prevents back flow of the liquid in the prover that was supplied from the second (supply) end ($H_2$) of assembly 20 to the first end ($H_1$) of the assembly when a bottom-fill prover measurement is performed. Interconnect fitting 26 is connected at a first end to the inlet of check valve 24 and at a second opposing end to the first end of liquid flow control device 28. The second end of liquid flow control device 28 is connected to liquid supply locking device 90 at the second (supply) end of the bottom-fill assembly. During bottom-fill proving measurements, the second (prover) end of liquid supply adapter 91 (as shown in FIG. 11(a)) or nozzle adapter assembly 70 (as shown in FIG. 11(b) or FIG. 11(c)) is locked into liquid supply locking device 90. Normally the end fitting of the gas pump's hose 92 would interface with a nozzle when the gas pump is used to supply gasoline to the filler neck of an automobile's fuel tank. In use with the bottom-fill assembly, the nozzle is removed from the end fitting of the gas pump's hose (typically a male/female screw thread interface) and the first end of the liquid supply adapter 91 is connected to the end fitting of the gas pump's hose 92. Flow control device 28 can be any device that suitably controls flow of the liquid through the bottom-fill assembly, for example, a ball valve. In this example, flow control device 28 has a flow control lever mechanism 28a for opening or closing the valve. Fittings 22a, 22b and 22c are not necessarily used in other examples of the invention, and the check valve and flow control device (if used) may be directly or otherwise connected to each other. A device for preventing back flow, such as check valve 24 is the required component in the bottom-fill assembly. Liquid supply locking device 90 at the second end of the assembly, can be any type of locking device, for example, an external clamping lock that clamps either to a liquid supply adapter 91, as further described below or a nozzle adapter assembly 70, as further described below. As mentioned above in some examples of the invention, at least the liquid supply locking device 90 (and optional flow control device 28) can be oriented at an angle above horizontal so that the liquid supply can enter the liquid supply locking device 90 in a downwards direction, for example, when a pump's nozzle is used and it is desired to point the spout of the nozzle in a downward direction before dispensing liquid from the liquid dispensing pump. As mentioned above it is always preferable that the check valve is disposed at angle below horizontal to avoid trapping air in the bottom-fill assembly between the check valve and its first (prover) end.

Figure 10A:
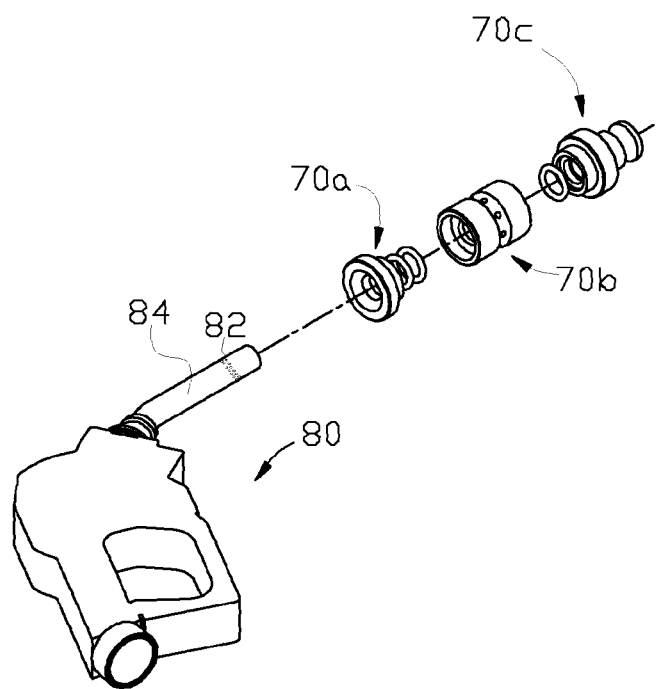
FIG. 10(a) and FIG. 10(b) are isometric views of an automatic shut-off nozzle shown relative to an exploded view and assembled view, respectively, of the automatic shut-off nozzle adapter shown in FIG. 9(a) and FIG. 9(b).

Use of liquid supply adapter 91 requires removal of the nozzle that is used with the liquid dispensing pump being proved with the prover system of the present invention. If the nozzle is, for example, an automatic shut-off nozzle (with or without stage II vapor recovery), the nozzle may not interface directly with bottom fill assembly 20. An automatic shut-off nozzle utilizes a vacuum tube sensing port near the tip of the dispensing end of the nozzle's spout. For a stage II vapor recovery nozzle, vapor recovery holes will also be present on the spout. The vacuum tube sensing port comprises one or more openings 82 in the outer perimeter of spout 84 of the automatic shut-off nozzle 80 as shown in FIG. 10(a). In order to dispense a liquid (such as gasoline) from the nozzle, the opening(s) of the sensing port (and, if used, the stage II vapor recovery holes) need to be in communication with a supply of air (ambient) since the automatic shut-off components inside the nozzle depend upon vacuum suction intake of air to enable normal gasoline dispensing. In normal operation, for example, when the spout is inserted into the filler neck of an automobile's fuel tank the automatic shut-off activates when gasoline supplied from the spout begins to rise in the filler neck to block air to the sensing port and enables the automatic shut-off of gasoline from the spout. If, for example, the spout of an automatic shut-off nozzle is inserted directly into the first (supply) end of the liquid supply locking device 90 in the above example of the invention, supply air would be blocked from the sensing port on the spout of the nozzle and it would not be possible to disable the automatic shut-off of the nozzle so that gasoline could be supplied to prover 12.

Figure 10B:
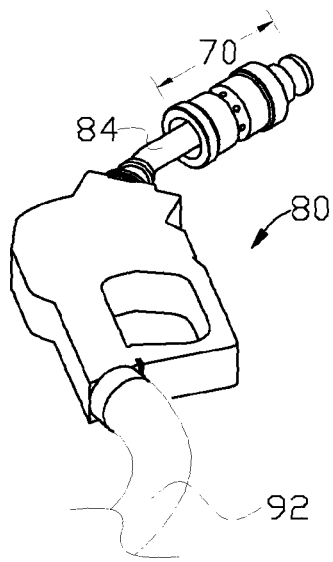

It is another object of the present invention to provide apparatus and method for defeating the automatic shut-off of a nozzle when the nozzle is being used with a test or measurement apparatus, such as a liquid prover of the present invention. FIG. 9(a) illustrates one example of a nozzle adapter assembly 70 of the present invention. As further illustrated in FIG. 9(b) assembly 70 in this example comprises: a spout lock fitting 70a; a spout sensing port interface fitting 70b; and a prover (or other test or measurement) dock fitting 70c. Supplemental sealing elements between these fittings, such as 0-rings 76' and 76" can be provided as required. Optional spout lock fitting 70a provides a means for locking (sealing) spout 84 of a nozzle into the interior through opening of assembly 70. Any suitable locking mechanism, such as a camlock fluid fitting can be used. Prover dock fitting 70c is configured to lock (seal) in the second (supply) end of supply liquid locking device 90 in the bottom-fill assembly (or other test and measurement apparatus). Spout sensing port interface fitting 70b enables a supply of air to the spout sensing port (opening(s) 82) on the spout when an automatic shut-off nozzle is inserted into spout lock fitting 70a (with or without stage II vapor recovery holes). One example of spout sensing port interface fitting 70b is illustrated in cross section in FIG. 9(c) and FIG. 9(d). An annular air intake plenum 70d is provided in fitting 70b. The annular ambient air intake plenum has one or more air passages 70e in communication with internal annular air plenum 70f provided within axial distance $d_9$ of spout sensing port interface fitting 70b. As shown in FIG. 9(d) when spout 84 is properly inserted into nozzle adapter assembly 70 the spout sensing port 82 is in communication with internal annular air plenum 70f so that a supply of air is maintained to the spout sensing port and dispensing of gasoline through the nozzle's spout is possible and enabled without enabling automatic shut-off of liquid flow through the nozzle. A spout insert stop ledge 70c' can be provided in prover dock fitting 70c so that the tip of an inserted spout butts up against ledge 70c' to ensure that the spout sensing port 82 (and, if used, stage II vapor recovery holes) is in communication with internal annular plenum 70f. Therefore nozzle adapter assembly 70 allows proving the meter on the dispensing pump with the pump's nozzle installed as in normal operation with the liquid proving system of the present invention as shown in FIGS. 10(b) and 11(b). As mentioned above, when any nozzle is used, it may be preferably to have the nozzle spout point downwards for entry into the nozzle adapter assembly as shown in FIG. 11(c). In these examples of the invention the bottom-fill assembly can be arranged with at least the liquid supply locking device 90 disposed at an angle above horizontal. Alternatively nozzle adapter assembly 70 can incorporate an elbow section that allows the spout entry to the nozzle adapter assembly be positioned at an angle above horizontal as shown in FIG. 11(c) with elbow fitting 22d.

Figure 12A:
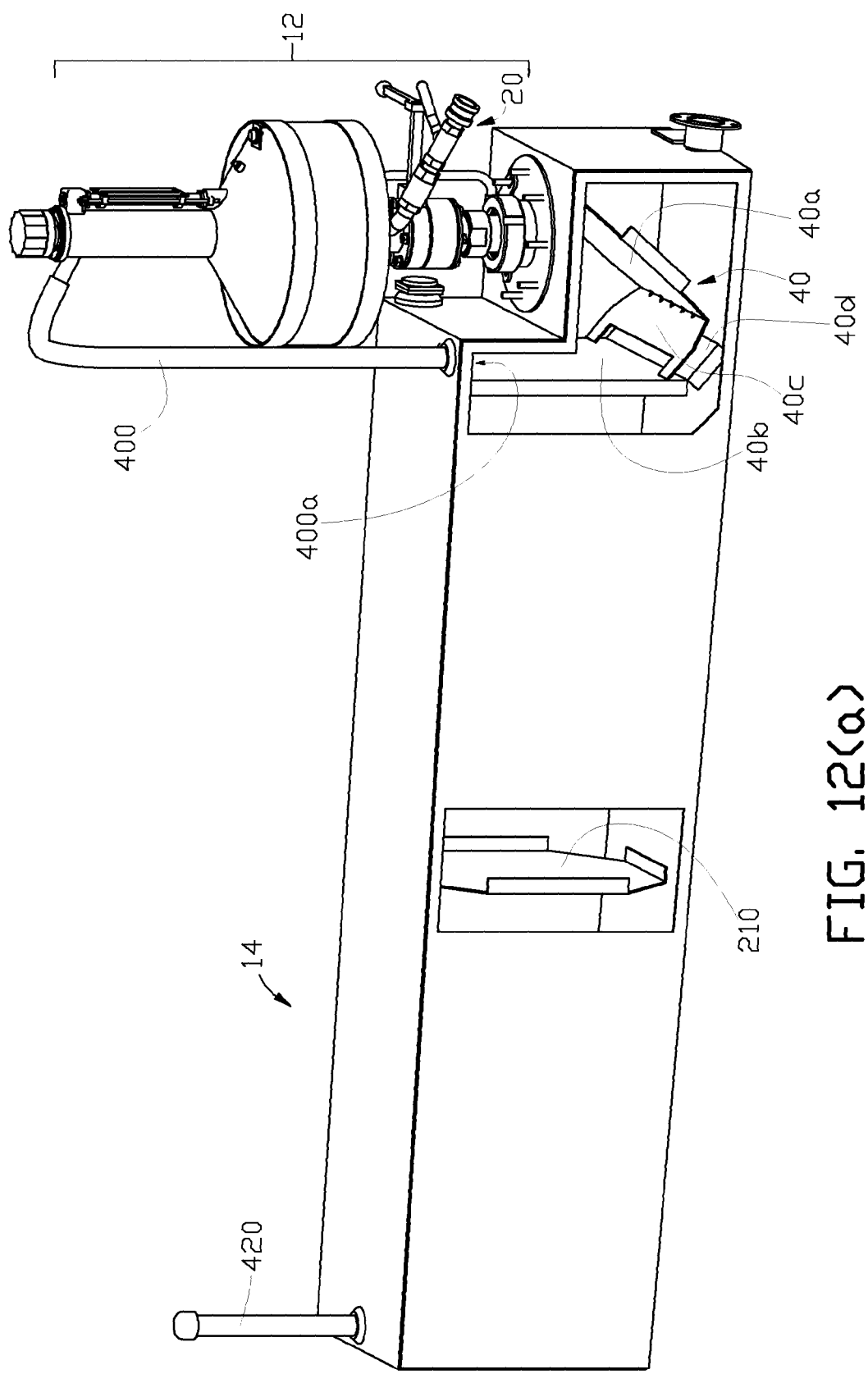
FIG. 12(a) is a partial isometric view of a liquid proving system of the present invention illustrating one example of a liquid holding tank baffle assembly shown in a tank cut-out view as used in a liquid proving system of the present invention.

Liquid holding tank 14 is similar to liquid holding tank 200 described above in that it contains an interior mid-tank vertically oriented anti-slosh baffle 210 and liquid level float switch 212. Anti-slosh baffle 210, which is visible in the liquid holding tank cross section in FIG. 7(b) and the liquid holding tank cutout detail in FIG. 12(a), is not related to proving measurements of the present invention; it is provided to dampen lateral liquid sloshing oscillations when prover system 10 is mounted on a movable structure, such as the bed of a pickup truck. Liquid float switch 212 is visible in the liquid holding tank cross section in FIG. 7(b) and is shown in alternate tank empty (solid lines) and tank full (dashed lines) positions. The switch in the tank's interior gives an operator an indication of when the tank is full and requires emptying via discharge line 200a and discharge valve 200b.

Figures 12B, 12C:
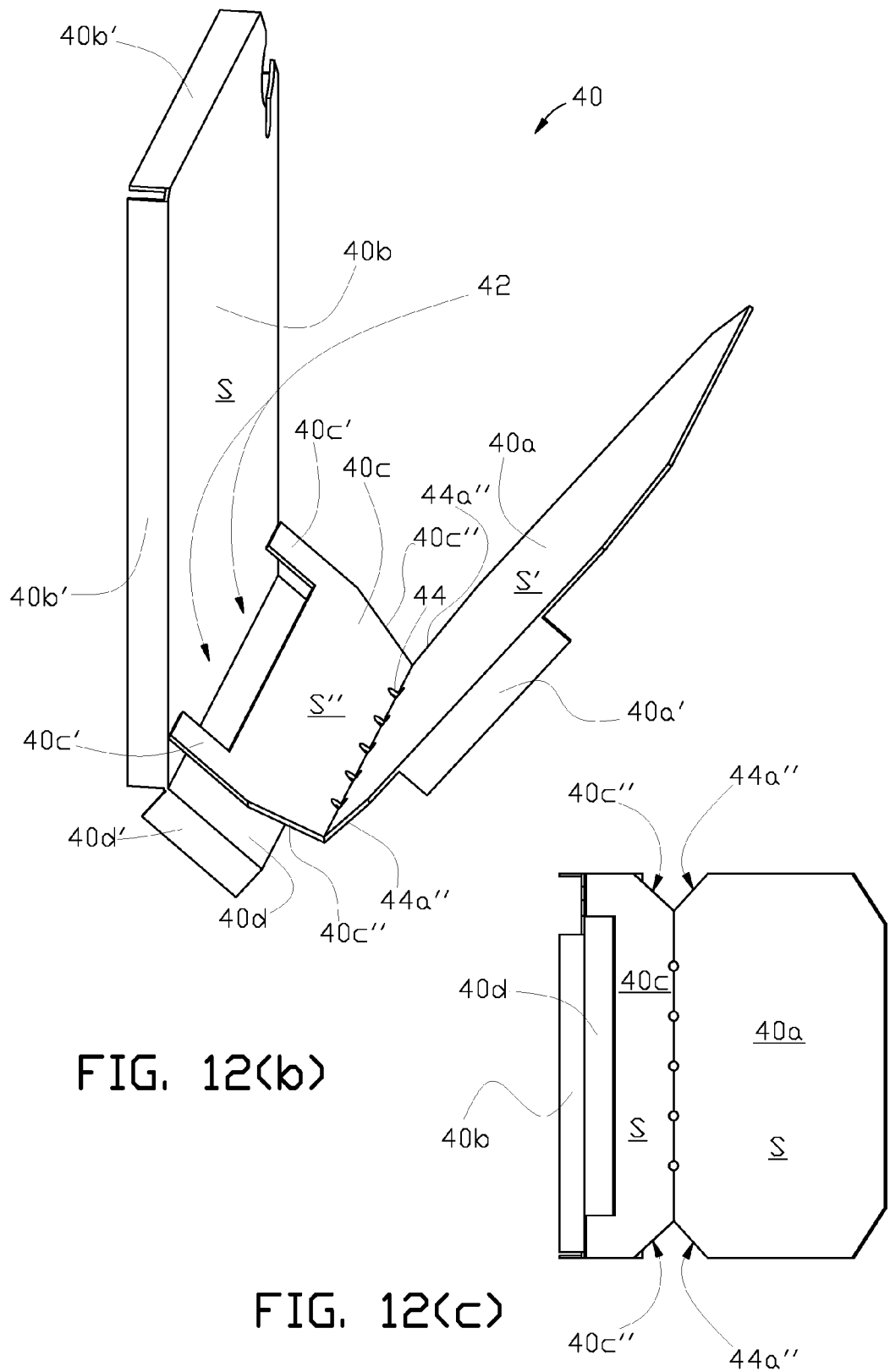
FIG. 12(b) is the liquid holding tank baffle assembly shown in FIG. 12(a) when it is removed from the liquid holding tank.
FIG. 12(c) is a top view of the liquid holding tank baffle assembly shown in 12(b).
Figure 13A:
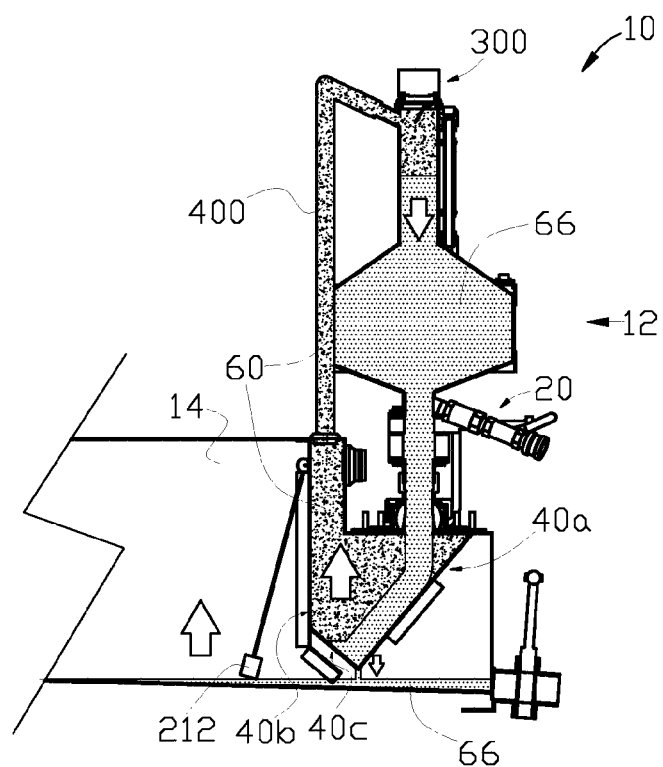
FIG. 13(a) through FIG. 13(d) illustrate fluid and vapor flow within and around the liquid holding tank baffle assembly as the liquid holding tank fills.
Figure 13B:
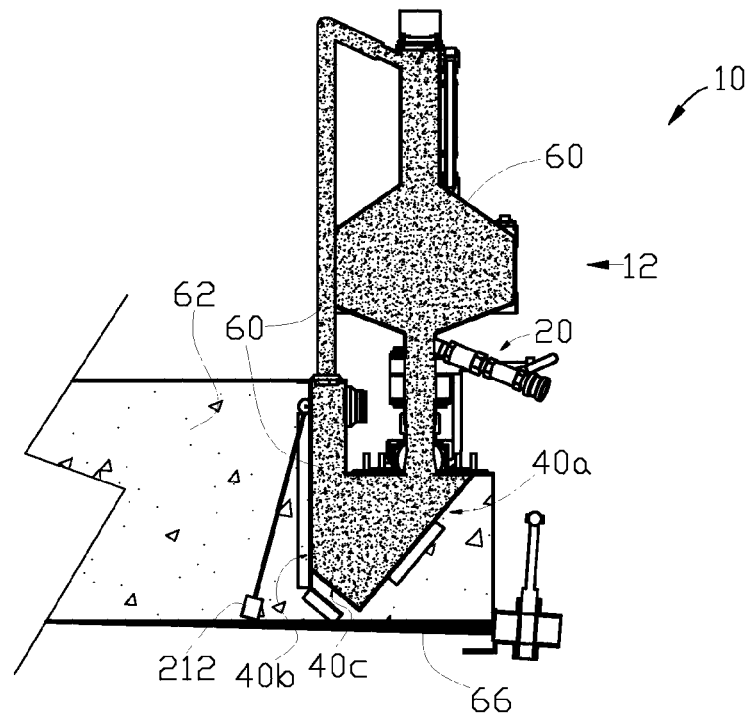
Figure 13C:
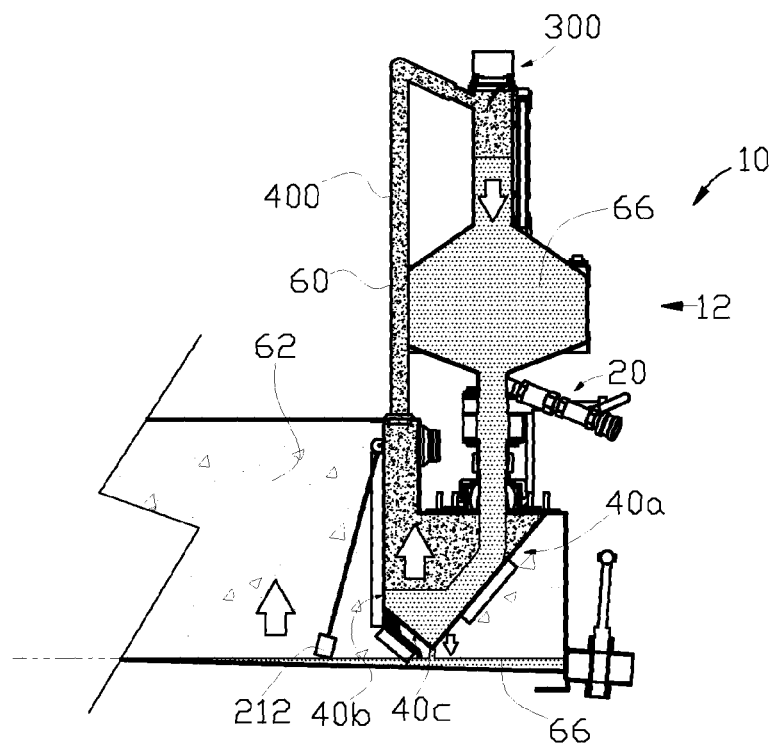
Figure 13D:
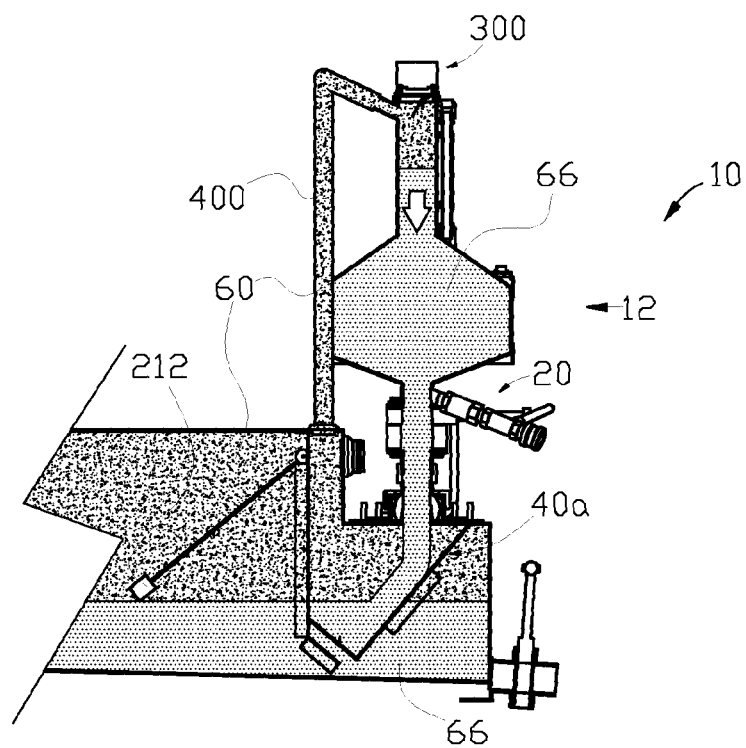

Unlike prior liquid holding tank 200, liquid holding tank 14 contains tank baffle assembly 40, which is shown in FIG. 12(b) and installed in liquid holding tank 14 in FIG. 12(a). In this example of the invention, tank baffle assembly comprises forward plate 40a, rear plate 40b, interior lower plate 40c and exterior lower plate 40d. Side tabs 40a', 40b' and 40d' provide one method of attaching the forward, rear and exterior lower plates to the interior sides of liquid holding tank 14, and the rear plate's top to the interior top of the liquid holding tank. In this example, when installed in tank 14, rear plate 40b is oriented vertically in the tank and is positioned behind the end of vapor conduit 400 opening 400a into liquid holding tank 14.

Interior lower plate 40c is in contact with the surface of the rear plate facing the vapor conduit opening at interior lower plate end tabs 40c' at an interior lower plate distance above the lower edge of the rear plate. The surface of the interior lower plate 40c facing the vapor conduit opening forms an obtuse angle with the upper surface S, of rear plate 40b, and the open space between end tabs 40c' establishes liquid spillway opening 42. The lower edge of interior lower plate 40c is connected at an angle to the lower edge of forward plate 40a, which may be, for example, at a 90 degree angle, with the forward plate being oriented (tilted) off of vertical in a direction away from the vertical rear plate, and located under the interior opening of the prover's drain section 100c' so that when liquid is in the prover and drain valve 100d is open, liquid from the prover splashes on to the angled surface, S", of forward plate 40a to cause a turbulent flow that disperses the liquid and enhance saturated vapor formation from the liquid in the bounding volume of the tank baffle assembly that can be referred to as the baffle volume. The upper edge of exterior lower plate 40d is connected at an obtuse angle to the lower edge of rear plate

40b, which obtuse angle may be equal to the obtuse angle formed between the interior lower plate and the rear plate as described above. One or more openings 44 in the connected edges of the forward and interior lower plates allow a restrained low flow of liquid into the bottom of liquid holding tank 14. Optionally, as shown in FIG. 12(*b*) and FIG. 12(*c*) inward tapering of the lower side edges 40*c*″ of the interior lower plate 40*c* and inward tapering of the lower edges 40*a*″ of the forward plate 40*a* establish spillways that allow liquid to escape to the bottom of the tank in a restrained low flow in the space between the lower side edges and the interior side walls of tank 14 as liquid is poured into the tank controlled volume bounded by the surfaces, S', S″ and S, of the forward, interior lower and rear plates, respectively, of tank baffle assembly 40. As the liquid further rises in this tank controlled volume, liquid spills out of the tank controlled volume through spillway opening 42, which liquid splashes onto the upper surface of exterior lower plate 40*d*, which disperses and enhances the formation of vapor between the opposing surfaces of the lower interior and exterior surfaces and impedes vapor dissipation into the liquid holding tank volume outside of the bounding volume of the tank baffle assembly. As shown in FIG. 12(*a*) the lower surface of the exterior lower plate is located above the interior bottom of the liquid holding tank to allow a restrained flow of the liquid outside of the bounding volume of the tank baffle assembly and into the remaining volume of the liquid holding tank. Most broadly the tank baffle assembly 40 is arranged to reduce the liquid holding tank volume in which vapor is dispersed particularly during early filling of the tank from prover measurements. As disclosed above tank baffle assembly 40 enhances vapor formation in the tank controlled volume formed by the tank baffle assembly by creating splashing and turbulence within the tank controlled volume and directs the flow of the liquid and vapor from the tank controlled volume. In this example of the invention the tank controlled volume is formed primarily from forward plate 40*a*, rear plate 40*b*, interior lower plate 40*c*, the opposing interior side walls of the liquid holding tank and the top of the liquid holding tank between the rear plate and forward plate that encompasses the vapor conduit opening 400*a* into the liquid holding tank and the prover's drain section opening into the liquid holding tank. Variations from the above tank baffle assembly that can accomplish these functions and are within the capabilities of one skilled in the art are contemplated as being within the scope of the invention.

One feature of the present invention is that the tank baffle assembly 40 is formed to trap vapor within the tank controlled volume rather than allowing the vapor to disperse freely within the total interior volume of the liquid holding tank as the liquid holding tank fills from multiple prover measurements. FIG. 13(*a*) through FIG. 13(*d*) illustrate this feature for the particular example tank baffle assembly 40 described above. In FIG. 13(*a*) liquid state (designated by dotted regions and reference number 66) in prover 12 (which may be a 5 gallon prover) from a top or bottom fill prover measurement drains into the liquid holding tank controlled volume within tank baffle assembly 40 (the baffle volume) when drain valve 100*d* is opened. Liquid splashing on forward plate 40*a* enhances formation of saturated vapor within the tank controlled volume and the saturated vapor (designated by dense stippled regions and reference number 60) exits up into vapor conduit 400 (indicated by upwards pointing arrow) in FIG. 13(*a*) as the liquid 66 accumulating in the tank controlled volume slowly drains directly to the bottom of the tank at the restrained flow rate through openings 44 in the connected edges of the forward and interior lower plates and in the regions formed between the side walls and optional lower inward tapered edges (44*a*″ and 44*c*″) of the forward and interior lower plates (44*a* and 44*c*) if provided. The tank controlled volume is generally sized to allow unhampered gravity drain of a prover's volume of liquid. Generally this means that the tank controlled volume is slightly larger than the volume of the prover, that is, for example, from 1.0 to approximately 1.2 times larger than the volume of the prover. For example a liquid prover system with a 5 gallon capacity prover with an 80 gallon total capacity liquid holding tank and a tank controlled volume of 6 gallons (approximately 1.2 times larger than 5 gallons) can be described as a liquid prover system with a 6 gallon primary liquid holding tank (the tank controlled volume) that drains into an 80 gallon secondary liquid holding tank (the total liquid holding tank volume). A smaller volume may be acceptable since the liquid in the tank controlled volume is continuing to drain into the remaining liquid holding tank volume. Minimizing the controlled tank volume according to the above requirements decreases the time required to reach vapor saturation in the substantially closed volume formed by the combination of the vapor tank baffle assembly, the vapor conduit and the bottom drain prover, and results in more accurate volumetric test results. As shown in FIG. 13(*b*) saturated vapor 60 is trapped within the tank controlled volume while a level of non-saturated vapor in the remainder of the tank (designated by less dense stippled regions and reference number 62) is significantly lower than saturated. In FIG. 13(*c*) as liquid continues to rise in the tank controlled volume, it spills over through spillway opening 42 between the interior lower plate and the rear plate, and over the surface of the exterior lower plate to continue to trap saturated vapor 60 from the liquid and direct the vapor up into vapor conduit 400 as indicated by the arrow in FIG. 13(*c*). Since the top-fill opening is sealed during a top-fill or bottom-fill of prover 12 as described above, the saturated vapor is contained within the interior volume of the prover (as shown by the arrows) and repeated prover measurement accuracy previously degraded by vapor dispersing throughout the entire interior volume of the liquid holding tank is improved. For a top-fill, the top-fill opening is further sealed by placement of the nozzle in the top-fill opening self sealing assembly, and for a bottom-fill the top-fill opening is sealed by placement of the breather cap over the top opening as described above. In FIG. 13(*d*) the entire holding tank 14 and closed prover environment is a combination of saturated vapor 60 and liquid 66 as the holding tank continues to fill from repeated prover measurements.

Figure 14:
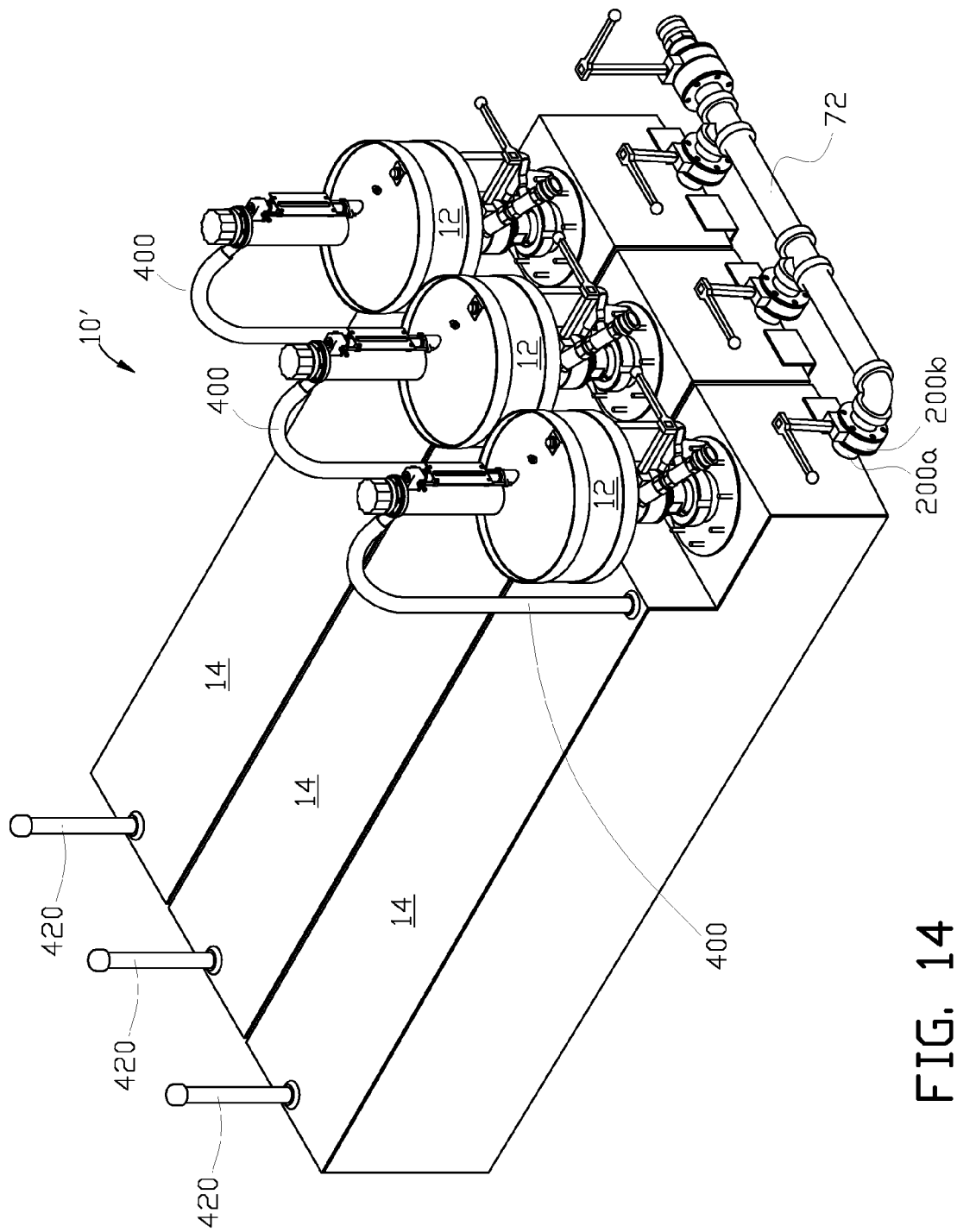
FIG. 14 is an isometric view of another example of the small volume bottom drain liquid proving system of the present invention.

FIG. 14 illustrates another example of the liquid prover system of the present wherein a plurality of liquid prover systems 10', namely three in this example, as shown in FIG. 7(*a*) and FIG. 7(*b*) are connected to common support structure, which can be outfitted with wheels to form a wheeled trailer that can be transported between sites for calibration measurement of dispensing pumps' meters at each site. Alternatively the plurality of provers and structure support may be installed on a vehicle, such as the flat bed of a pickup truck. Multiple prover systems installed on a common vehicle are convenient, for example, for proving pumps dispensing multiple grades of gasoline. Meter calibration for each grade of gasoline can be accomplished in a separate prover and liquid holding tank installed on the common vehicle.

The above examples of the invention describe prover system 10, which has combined top-fill and bottom-fill features. In other examples of the invention, the top opening of prover 12 may be permanently sealed to form a bottom-fill only and bottom drain prover system with liquid holding tank 14.

When the combined top-fill feature is provided on prover 100, the method of using the liquid proving system of the present invention can be the same as that disclosed in U.S. Pat. No. 7,874,195, which is incorporated herein in its entirety, since the check valve in the bottom-fill assembly prevents flow of liquid out of the second end of the bottom fill assembly as described above.

In operation one example method of using the bottom-fill feature of the liquid proving system of the present invention is as follows. If the proving system also provides optional top fill operation, the breather cap assembly 300 remains installed on the prover through the bottom fill operation. Prover 12 is at least once initially filled with liquid from a metering device or pump, for example, by attaching liquid supply adapter 91, as shown in FIG. 11(*a*), or nozzle adapter assembly 70, as shown in FIG. 11(*b*) or FIG. 11(*c*) to the liquid supply locking device 90 at the second end of bottom-fill assembly 20 or 20', and pumping liquid into the prover either through the top or bottom fill assembly from a liquid dispensing nozzle or liquid dispensing device prior to performing a calibration fill. In the example shown in FIG. 11(*a*) liquid supply adapter 91 is connected to a liquid supply hose 92; in other examples of the invention, liquid supply adapter 91 may be connected to piping or other liquid supply elements. In a calibration fill, a nominal volume (for example 5.0 gallons or 20.0 liters) of the liquid, as measured by the meter reading on the metering device is pumped into the prover from the dispensing pump. The meter reading is compared with the volume of liquid in the prover as measured by the volume gauge (neck scale reading) on the prover to determine the degree of error in the meter reading. If the error exceeds an allowable value, the meter can be recalibrated and another calibration fill of the prover can be made to confirm that the recalibration brings the meter within an acceptable tolerance range.

As mentioned above another method for a calibration fill is to pump liquid into the prover until the neck scale on the prover reads the nominal capacity, at which time, the meter on the pump can be recalibrated to the nominal capacity.

The pre-calibration filling of the prover is performed to wet down the internal surfaces of the prover so that the quantity of fluid adhering to these internal surfaces is consistent during repetitive fillings of the prover. Since the calibration measurement fill is performed after one or more pre-calibration fills, vapor saturation of the air in the prover, vapor conduit and liquid holding tank is assured, in particular by use of the tank baffle assembly as described above, particularly if the liquid (such as gasoline) has a strong tendency to evaporate. Maintaining a vapor saturated environment inside the prover effectively restricts the vaporization of the volatile liquid. Minimizing evaporation from the volume of liquid pumped into the prover, and release of vapor from the prover, during a calibration fill is important since for a highly volatile liquid such as gasoline, the volume of liquid lost in the release of vapor, for example, by allowing the vapor to dissipate into the entire holding tank volume without the tank baffle assembly of the present invention, can be significant. Consequently without controlling vapor release as with the liquid prover system of the present invention, the prover's gauge reading may incorrectly attribute a volumetric error to the calibration of the meter in the liquid dispensing device that actually results from vapor loss during filling of the prover.

After each filling of the prover with liquid, the liquid can be drained from the prover by opening drain valve 100*d* with the distribution of liquid and saturated vapor in the prover system of the present invention being as typically described above, and illustrated in FIG. 13(*a*) through FIG. 13(*d*) after the prover is drained. Since the interior of the prover, the vapor conduit and the vapor tank baffle assembly in the liquid holding tank are a substantially closed path system, vapor saturated air is drawn (suctioned) into the interior prover volume via vapor conduit to replace the drained liquid from the prover. By maintaining the vapor saturated environment, evaporation is effectively restricted.

The prover can be repeatedly used by draining each measured volume of liquid from the prover into the liquid holding tank after being filled until a decision is made to empty the liquid holding tank before full capacity of the liquid holding tank is reached. At that time, liquid holding tank drain valve 200*b* (FIG. 7(*a*) or FIG. 14) can be opened to drain the accumulated fluid from the liquid holding tank (with air flowing into the liquid holding tank via air vent 420 typically back into a storage tank supplying liquid to the dispensing pump.

In some examples of the invention separate top-fill and bottom-fill volume gauges or indicators may be provided on a prover used in a liquid prover system of the present invention.

While the above applications of the invention describe liquid dispensing pumps at gas stations and the like, the liquid proving system of the present invention is also of benefit in other applications, particularly where the liquid is highly volatile.

The nozzle adapter assembly disclosed herein may be utilized in other test or measurement applications that required provisions for overriding an automatic shut-off nozzle.

The present invention has been described in terms of preferred examples and embodiments. Equivalents, alternatives and modifications, aside from those expressly stated, are possible and within the scope of the invention.

The invention claimed is:

1. A small volume bottom drain liquid proving system comprising:
   a small volume prover comprising an upper neck section, the upper neck section having a top fill opening for receiving a liquid, a central section for accumulating the liquid, and a drain section, the drain section having a bottom fill opening;
   a gauge in fluid communication with an interior prover volume of the small volume prover to measure a volume of the liquid in the interior prover volume of the small volume prover;
   a prover drain device for controlling the release of the liquid in the small volume prover, the prover drain device disposed below the bottom fill opening;
   a liquid holding tank for receiving the liquid released from the small volume prover by the prover drain device through a tank prover opening disposed below the prover drain device;
   a vapor conduit connecting an interior prover neck volume of the upper neck section to an interior tank volume of the liquid holding tank by a tank vapor conduit opening;
   a vapor tank baffle assembly disposed in the holding and positioned below the tank prover opening and the tank vapor conduit opening to generate a liquid vapor from the liquid released from the small volume prover and to contain the liquid vapor within the vapor tank baffle assembly and to direct the liquid vapor into the vapor conduit via the tank vapor conduit opening;
   a prover top fill opening self sealing assembly having a top self sealing opening that opens when a liquid dispensing nozzle for supplying the liquid to the interior prover volume is pushed against the top self sealing opening and forms a substantially vapor tight seal around the liquid dispensing nozzle;

a prover bottom-fill assembly having an interior bottom-fill assembly through passage from a prover bottom-fill assembly end to a liquid supply bottom-fill assembly end for supply the liquid to the interior prover volume, the interior bottom-fill assembly passage at the prover bottom-fill assembly end in communication with the bottom fill opening in the drain section of the small volume prover; and a vent connecting the interior tank volume of the liquid holding tank to atmosphere.

2. The small volume liquid proving system of claim 1, the vapor tank baffle assembly comprising:

a rear baffle plate oriented vertically in the liquid holding tank behind the tank vapor conduit opening so that a rear baffle plate conduit facing side surface of the rear baffle plate faces a baffle volume below the tank vapor conduit opening, the rear baffle plate attached to the interior sides and top of the liquid holding tank, a lower edge of the rear baffle plate raised above the interior bottom of the liquid holding tank;

an interior lower baffle plate in contact with the rear baffle plate conduit facing side surface by opposing interior lower baffle plate end tabs disposed at an interior lower baffle plate distance above the lower edge of the rear baffle plate, the interior lower baffle plate forming an interior lower baffle plate obtuse angle with the rear baffle plate conduit facing side surface so that the opposing interior lower baffle plate end tabs and the interior lower baffle plate have a conduit facing side surface facing the baffle volume; an opening between the opposing interior lower baffle plate end tabs forming a liquid spillway;

a forward baffle plate attached to the sides of the liquid holding tank and having a forward baffle plate conduit facing side surface facing the baffle volume, the forward baffle plate having a lower forward baffle plate edge connected to an interior lower baffle plate edge of the interior lower baffle plate to form a lower forward and lower interior baffle plate connection, the forward baffle plate oriented off of vertical in a direction away from the vertically oriented rear baffle plate, and the forward baffle plate conduit facing side surface positioned below the tank vapor conduit opening so that the liquid in the small volume prover released by the prover drain device splashes onto the forward baffle plate conduit facing side to form a saturated vapor from the liquid;

at least one opening in the lower forward baffle plate edge connection to the interior lower baffle plate edge to provide a restrained flow of liquid from the tank vapor conduit opening to the bottom of the liquid holding tank;

one or more controlled liquid baffle drain openings at the lower forward and lower interior baffle plate connection; and an exterior lower baffle plate having a lower exterior lower baffle plate edge attached to the lower edge of the rear baffle plate and an exterior lower baffle plate conduit facing side surface facing the baffle volume, the exterior lower baffle plate conduit facing side surface forming an exterior lower baffle plate obtuse angle with the rear baffle plate conduit facing side surface, the exterior lower baffle plate conduit facing spaced apart from the interior lower baffle plate to form a controlled tank liquid dispersion and vapor formation surface for the liquid passing through the liquid spillway.

3. The small volume liquid proving system of claim 2, the vapor tank baffle assembly further comprising an inwardly tapered opposing lower side edges of the interior lower baffle plate and the forward baffle plate adjacent to the lower forward and lower interior baffle plate connection.

4. The small volume liquid proving system of claim 1, the prover bottom-fill assembly comprising a check valve (24) and a liquid supply locking device (90) having a liquid supply end and a prover liquid delivery end, the liquid supply locking device located at the liquid supply bottom-fill assembly end of the prover bottom-fill assembly, the check valve interposed between the prover liquid delivery end of the liquid supply locking device and the bottom fill opening in the drain section of the small volume prover.

5. The small volume liquid proving system of claim 4, the prover bottom-fill assembly further comprising at least one elbow assembly to raise or lower the horizontal height of the liquid supply bottom-fill assembly end of the prover-bottom fill assembly relative to the horizontal height of the prover bottom-fill assembly end.

6. The small volume liquid proving system of claim 4, the prover bottom-fill assembly further comprising a liquid supply adapter (91) or a nozzle adapter assembly (70) located at the liquid supply end of the liquid supply locking device (90).

7. The small volume liquid proving system of claim 6, the nozzle adapter assembly (70) comprising:

a spout locking device for locking a spout of an automatic shut-off nozzle inserted within the spout locking device;

a prover docking device for locking with the liquid supply end of the liquid supply locking device; and a spout sensing port interface fitting interconnecting the spout locking device and the prover docking device to enable a supply of ambient air to a spout sensing port located on the spout of the automatic shut-off nozzle inserted within the spout locking device.

8. The small volume liquid proving system of claim 7 wherein the supply of ambient air to the spout sensing port located on the spout of the automatic shut-off nozzle inserted within the spout locking device is provide by an annular ambient air intake plenum in the spout sensing port interface, the annular air intake plenum having one or more passages in communication with an internal annular air plenum whereby the spout sensing port on the spout of the automatic shut-off nozzle inserted within the spout locking device is in communication with the internal annular air plenum to enable supply of liquid to the small volume prover via the prover bottom-fill assembly.

9. The small volume liquid proving system of claim 4, the prover bottom-fill assembly further comprising a liquid flow control device (28) interposed between the check valve and the prover liquid delivery end of the liquid supply locking device.

10. The small volume liquid proving system of claim 9, the prover bottom-fill assembly further comprising at least one elbow assembly to raise or lower the horizontal height of the liquid supply bottom-fill assembly end of the prover-bottom fill assembly relative to the horizontal height of the prover bottom-fill assembly end.

11. The small volume liquid proving system of claim 9, the prover bottom-fill assembly further comprising a liquid supply adapter (91) or a nozzle adapter assembly (70) located at an end of the liquid supply locking device (90).

12. A method of measuring a volume of a liquid pumped into a small volume prover, the method comprising the steps of:

alternatively inserting a liquid dispensing nozzle through a prover top fill self sealable opening in a top fill opening of a small volume prover or inserting a liquid dispensing device through a prover bottom fill opening;

supplying the volume of the liquid from the liquid dispensing nozzle or the liquid dispensing device into a prover interior volume of the small volume prover;

forming a vapor saturated volume within the combination of: the prover interior volume of a small volume prover; a baffle vapor volume within a liquid holding tank having a tank prover opening disposed below a prover drain device for releasing the liquid into the liquid holding tank, the tank prover opening in communication with the prover interior volume; and a vapor conduit connected between the prover interior volume and the baffle vapor volume within the liquid holding tank whereby release of a liquid vapor from the volume of liquid pumped into the prover interior volume is inhibited from dissipating within the liquid holding tank beyond the baffle vapor volume;

measuring the volume of the liquid supplied to the small volume prover with a prover gauge in fluid communication with the interior prover volume; and comparing a dispensing device metered volume measured by the dispensing device meter for the liquid dispensing nozzle or the liquid dispensing device with the prover gauge.

13. The method of claim 12 wherein supplying the volume of the liquid from the liquid dispensing device into the prover interior volume of the small volume prover comprises supplying the volume of the liquid from a gas pump hose.

14. The method of claim 12 wherein supplying the volume of the liquid from the liquid dispensing device into the prover interior volume of the small volume prover comprises supplying the volume of the liquid from an automatic shutoff nozzle without activation of the automatic shutoff.

15. A method of measuring a volume of a liquid pumped into a small volume prover from a metered dispensing device, the method comprising the steps of:

alternatively inserting a liquid dispensing nozzle associated with the metered dispensing device through a prover top fill self sealable opening in a top fill opening of the small volume prover or inserting the liquid dispensing nozzle associated with the metered dispensing device through a bottom fill opening via a prover bottom-fill assembly comprising a check valve, a liquid supply locking device and a nozzle adapter assembly located at a liquid supply bottom-fill assembly end of the prover bottom-fill assembly, the liquid supply locking assembly interposed between the check valve and the nozzle adopter assembly, the check valve connected to the bottom fill opening;

inserting a spout of a liquid dispensing off nozzle having an automatic shut-off mechanism into the nozzle adapter assembly to supply ambient air to a spout automatic shut-off sensing port located on the spout to enable the supply of at least one preliminary volume of the liquid from the liquid dispensing nozzle into the small volume prover without activation of the automatic shut-off mechanism;

forming a substantially closed volume from the interior of a liquid holding tank, the small volume bottom drain prover drainable into the liquid holding tank and a vapor conduit connected between the small volume prover near a top fill opening for pumping the liquid into the small volume prover and the liquid holding tank to establish a vapor saturated environment in the small volume prover and the liquid holding tank;

draining the at least one preliminary volume of the liquid from the small volume prover into the liquid holding tank;

supplying a nominal volume of the liquid from the liquid dispensing automatic shut-off nozzle into the small volume prover as measured by a dispensing device meter associated with the metered dispensing device whereby release of vapors from the nominal volume of the liquid is inhibited due to the vapor saturated environment;

measuring the nominal volume of the liquid supplied to the small volume prover with a prover gauge in fluid communication with an interior prover volume of the small volume prover; and comparing a dispensing device metered volume measured by the dispensing device meter with the prover gauge.

16. A small volume liquid proving system comprising:

a small volume prover comprising an upper neck section, a central section for accumulating the liquid, and a drain section, the drain section having a bottom fill opening;

a gauge in fluid communication with an interior prover volume of the small volume prover to measure a volume of the liquid in the interior prover volume of the small volume prover;

a prover drain device for controlling the release of the liquid in the small volume prover, the prover drain device disposed below the bottom fill opening;

a liquid holding tank for receiving the liquid released from the small volume prover by the prover drain device through a tank prover opening disposed below the prover drain device;

a vapor conduit connecting an interior prover neck volume of the upper neck section to an interior tank volume of the liquid holding tank by a tank vapor conduit opening;

a vapor tank baffle assembly disposed in the liquid holding tank and positioned below the tank prover opening and the tank vapor conduit opening to generate a liquid vapor from the liquid released from the small volume prover and to contain the liquid vapor within the vapor tank baffle assembly and to direct the liquid vapor into the vapor conduit via the tank vapor conduit opening;

a prover bottom-fill assembly having an interior bottom-fill assembly through passage from a prover bottom-fill assembly end to a liquid supply bottom-fill assembly end for supply the liquid to the interior prover volume, the interior bottom-fill assembly passage at the prover bottom-fill assembly end in communication with the bottom fill opening in the drain section of the small volume prover; and a vent connecting the interior tank volume of the liquid holding tank to atmosphere.

17. The small volume liquid proving system of claim 16, the vapor tank baffle assembly comprising:

a rear baffle plate oriented vertically in the liquid holding tank behind the tank vapor conduit opening so that a rear baffle plate conduit facing side surface of the rear baffle plate faces a baffle volume below the tank vapor conduit opening, the rear baffle plate attached to the interior sides and top of the liquid holding tank, a lower edge of the rear baffle plate raised above the interior bottom of the liquid holding tank;

an interior lower baffle plate in contact with the rear baffle plate conduit facing side surface by opposing interior lower baffle plate end tabs disposed at an interior lower baffle plate distance above the lower edge of the rear baffle plate, the interior lower baffle plate forming an interior lower baffle plate obtuse angle with the rear baffle plate conduit facing side surface so that the opposing interior lower baffle plate end tabs and the interior lower baffle plate have a conduit facing side surface facing the baffle volume; an opening between the opposing interior lower baffle plate end tabs forming a liquid spillway;

a forward baffle plate attached to the sides of the liquid holding tank and having a forward baffle plate conduit facing side surface facing the baffle volume, the forward baffle plate having a lower forward baffle plate edge connected to an interior lower baffle plate edge of the interior lower baffle plate to form a lower forward and lower interior baffle plate connection, the forward baffle plate oriented off of vertical in a direction away from the vertically oriented rear baffle plate, and the forward baffle plate conduit facing side surface positioned below the tank vapor conduit opening so that the liquid in the small volume prover released by the prover drain device splashes onto the forward baffle plate conduit facing side to form a saturated vapor from the liquid;

at least one opening in the lower forward baffle plate edge connection to the interior lower baffle plate edge to provide a restrained flow of liquid from the tank vapor conduit opening to the bottom of the liquid holding tank;

one or more controlled liquid baffle drain openings at the lower forward and lower interior baffle plate connection; and an exterior lower baffle plate having a lower exterior lower baffle plate edge attached to the lower edge of the rear baffle plate and an exterior lower baffle plate conduit facing side surface facing the baffle volume, the exterior lower baffle plate conduit facing side surface forming an exterior lower baffle plate obtuse angle with the rear baffle plate conduit facing side surface, the exterior lower baffle plate conduit facing spaced apart from the interior lower baffle plate to form a controlled tank liquid dispersion and vapor formation surface for the liquid passing through the liquid spillway.

18. The small volume liquid proving system of claim 17, the vapor tank baffle assembly further comprising an inwardly tapered opposing lower side edges of the interior lower baffle plate and the forward baffle plate adjacent to the lower forward and lower interior baffle plate connection.

19. The small volume liquid proving system of claim 16, the prover bottom-fill assembly comprising a check valve (24) and a liquid supply locking device (90) having a liquid supply end and a prover liquid delivery end, the liquid supply locking device located at the liquid supply bottom-fill assembly end of the prover bottom-fill assembly, the check valve interposed between the prover liquid delivery end of the liquid supply locking device and the bottom fill opening in the drain section of the small volume prover.

20. The small volume liquid proving system of claim 19, the prover bottom-fill assembly further comprising at least one elbow assembly to raise or lower the horizontal height of the liquid supply bottom-fill assembly end of the prover-bottom fill assembly relative to the horizontal height of the prover bottom-fill assembly end.

21. The small volume liquid proving system of claim 19, the prover bottom-fill assembly further comprising a liquid supply adapter (91) or a nozzle adapter assembly (70) located at the liquid supply end of the liquid supply locking device (90).

22. The small volume liquid proving system of claim 21, the nozzle adapter assembly (70) comprising:

a spout locking device for locking a spout of an automatic shut-off nozzle inserted within the spout locking device;

a prover docking device for locking with the liquid supply end of the liquid supply locking device; and a spout sensing port interface fitting interconnecting the spout locking device and the prover docking device to enable a supply of ambient air to a spout sensing port located on the spout of the automatic shut-off nozzle inserted within the spout locking device.

23. The small volume liquid proving system of claim 19, the prover bottom-fill assembly further comprising a liquid flow control device (28) interposed between the check valve and the prover liquid delivery end of the liquid supply locking device.

24. The small volume liquid proving system of claim 23, the prover bottom-fill assembly further comprising at least one elbow assembly to raise or lower the horizontal height of the liquid supply bottom-fill assembly end of the prover-bottom fill assembly relative to the horizontal height of the prover bottom-fill assembly end.

25. The small volume liquid proving system of claim 23, the prover bottom-fill assembly further comprising a liquid supply adapter (91) or a nozzle adapter assembly (70) located at an end of the liquid supply locking device (90).

26. The small volume liquid proving system of claim 22 wherein the supply of ambient air to the spout sensing port located on the spout of the automatic shut-off nozzle inserted within the spout locking device is provide by an annular ambient air intake plenum in the spout sensing port interface, the annular air intake plenum having one or more passages in communication with an internal annular air plenum whereby the spout sensing port on the spout of the automatic shut-off nozzle inserted within the spout locking device is in communication with the internal annular air plenum to enable supply of liquid to the small volume prover via the prover bottom-fill assembly.

27. A method of measuring a volume of a liquid pumped into a small volume prover, the method comprising the steps of:

inserting a liquid dispensing device through a prover bottom fill opening;

supplying the volume of the liquid from the liquid dispensing device into a prover interior volume of the small volume prover;

forming a vapor saturated volume within the combination of: the prover interior volume of a small volume prover; a baffle vapor volume within a liquid holding tank having a tank prover opening disposed below a prover drain device for releasing the liquid into the liquid holding tank, the tank prover opening in communication with the prover interior volume; and a vapor conduit connected between the prover interior volume and the baffle vapor volume within the liquid holding tank whereby release of a liquid vapor from the volume of liquid pumped into the prover interior volume is inhibited from dissipating within the liquid holding tank beyond the baffle vapor volume;

measuring the volume of the liquid supplied to the small volume prover with a prover gauge in fluid communication with the interior prover volume; and comparing a dispensing device metered volume measured by the dispensing device meter for the liquid dispensing nozzle or the liquid dispensing device with the prover gauge.

28. The method of claim 27 wherein supplying the volume of the liquid from the liquid dispensing device into the prover interior volume of the small volume prover comprises supplying the volume of the liquid from a gas pump hose.

29. The method of claim 27 wherein supplying the volume of the liquid from the liquid dispensing device into the prover interior volume of the small volume prover comprises supplying the volume of the liquid from an automatic shutoff nozzle without activation of the automatic shutoff.

30. A method of measuring a volume of a liquid pumped into a small volume prover from a metered dispensing device, the method comprising the steps of:

inserting the liquid dispensing nozzle associated with the metered dispensing device through a bottom fill opening via a prover bottom-fill assembly comprising a check valve, a liquid supply locking device and a nozzle adapter assembly located at a liquid supply bottom-fill assembly end of the prover bottom-fill assembly, the liquid supply locking assembly interposed between the check valve and the nozzle adopter assembly, the check valve connected to the bottom fill opening;

inserting a spout of a liquid dispensing off nozzle having an automatic shut-off mechanism into the nozzle adapter assembly to supply ambient air to a spout automatic shut-off sensing port located on the spout to enable the supply of at least one preliminary volume of the liquid from the liquid dispensing nozzle into the small volume prover without activation of the automatic shut-off mechanism;

forming a substantially closed volume from the interior of a liquid holding tank, the small volume prover drainable into the liquid holding tank and a vapor conduit connected between the small volume prover near a top fill opening for pumping the liquid into the small volume prover and the liquid holding tank to establish a vapor saturated environment in the small volume prover and the liquid holding tank;

draining the at least one preliminary volume of the liquid from the small volume prover into the liquid holding tank;

supplying a nominal volume of the liquid from the liquid dispensing automatic shut-off nozzle into the small volume prover as measured by a dispensing device meter associated with the metered dispensing device whereby release of vapors from the nominal volume of the liquid is inhibited due to the vapor saturated environment;

measuring the nominal volume of the liquid supplied to the small volume prover with a prover gauge in fluid communication with an interior prover volume of the small volume prover; and comparing a dispensing device metered volume measured by the dispensing device meter with the prover gauge.

\* \* \* \* \*